United States Patent
Pohl et al.

(10) Patent No.: US 9,034,447 B2
(45) Date of Patent: May 19, 2015

(54) ELECTROSTATICALLY BOUND HYPERBRANCHED ANION EXCHANGE SURFACE COATING PREPARED VIA CONDENSATION POLYMERIZATION USING DITERTIARY AMINE LINKERS FOR IMPROVED DIVALENT ANION SELECTIVITY

(75) Inventors: Christopher A. Pohl, Union City, CA (US); Kannan Srinivasan, Tracy, CA (US); Sheetal Bhardwaj, Fremont, CA (US)

(73) Assignee: DIONEX CORPORATION, Sunnyvale, CA (US)

( * ) Notice: Subject to any disclaimer, the term of this patent is extended or adjusted under 35 U.S.C. 154(b) by 0 days.

(21) Appl. No.: 13/416,891

(22) Filed: Mar. 9, 2012

(65) Prior Publication Data

US 2012/0231195 A1 Sep. 13, 2012

Related U.S. Application Data

(60) Provisional application No. 61/451,989, filed on Mar. 11, 2011.

(51) Int. Cl.
| | |
|---|---|
| *B32B 1/08* | (2006.01) |
| *C08J 5/22* | (2006.01) |
| *B01J 39/26* | (2006.01) |
| *B01J 41/12* | (2006.01) |
| *B01J 41/20* | (2006.01) |
| *B01J 47/00* | (2006.01) |
| *B01D 15/36* | (2006.01) |

(52) U.S. Cl.
CPC ............ *B01J 39/26* (2013.01); *Y10T 428/1393* (2015.01); *B01D 15/361* (2013.01); *B01J 41/125* (2013.01); *B01J 41/20* (2013.01); *B01J 47/006* (2013.01)

(58) Field of Classification Search
CPC ...... B01D 15/361; B01J 41/125; B01J 47/006
USPC ......................................... 428/36.91; 521/27
See application file for complete search history.

(56) References Cited

U.S. PATENT DOCUMENTS

| | | | |
|---|---|---|---|
| 2,927,022 A | 3/1960 | Martin et al. | |
| 3,893,982 A | 7/1975 | Gardner et al. | |
| 3,931,444 A | 1/1976 | McKenna et al. | |
| 4,027,020 A | 5/1977 | Green et al. | |

(Continued)

FOREIGN PATENT DOCUMENTS

| | | |
|---|---|---|
| CN | 1956784 A | 5/2007 |
| WO | WO 2005/082534 A1 | 9/2005 |
| WO | WO 2011/106720 A2 | 9/2011 |

*Primary Examiner* — Erik Kashnikow
(74) *Attorney, Agent, or Firm* — Jeffry S. Mann

(57) ABSTRACT

The present invention provides a new design for high capacity stationary phases for dianion selective ion chromatography. The stationary phases include one or more layers which are products of condensation polymerization. Multiple components are of use in forming the first polymer layer and the condensation polymer structure, thereby providing a stationary phase that can be engineered to have a desired property such as ion capacity, ion selectivity, and the like. Exemplary condensation polymers are formed by the reaction of at least one polyfunctional compound with at least one compound of complimentary reactivity, e.g., a nucleophilic polyfunctional compound reacting with an electrophilic compound.

19 Claims, 30 Drawing Sheets

(56) References Cited

U.S. PATENT DOCUMENTS

| | | |
|---|---|---|
| 4,089,977 A | 5/1978 | Green et al. |
| 4,101,460 A | 7/1978 | Small et al. |
| 4,325,940 A | 4/1982 | Green et al. |
| 4,373,031 A | 2/1983 | Waite |
| 4,418,054 A | 11/1983 | Green et al. |
| 5,147,536 A | 9/1992 | Engström |
| 5,204,376 A | 4/1993 | Henmi et al. |
| 6,039,876 A | 3/2000 | Yang |
| 6,074,541 A | 6/2000 | Srinivasan et al. |
| 7,291,395 B2 | 11/2007 | Pohl et al. |
| 2005/0181224 A1* | 8/2005 | Pohl et al. .................. 428/474.4 |
| 2007/0062854 A1 | 3/2007 | Pohl et al. |

* cited by examiner

FIG. 30

| Amine | Number of Cycles | Adj. RRT* |
|---|---|---|
| Methylamine | 3 | -0.059 |
| Dimethylamine | 2 | 0 |
| Dimethylamine | 3 | 0 |
| Dimethylamine | 4 | 0.051 |
| Tetramethylmethylenediamine | 2 | -0.048 |
| Tetramethylmethylenediamine | 3 | 0 |
| Tetramethylmethylenediamine | 4 | 0.036 |
| Tetramethylethylenediamine | 2 | -0.029 |
| Tetramethylethylenediamine | 3 | 0.056 |
| Tetramethylethylenediamine | 4 | 0.108 |
| Tetramethyldiaminopropane | 2 | 0.031 |
| Tetramethyldiaminopropane | 3 | 0.048 |
| Tetramethyldiaminopropane | 3.5 | 0.107 |
| Tetramethyldiaminobutane | 3.5 | 0.252 |
| 1,3-Bis(dimethylamino)-2-propanol | 3.5 | 0.112 |

* Adjusted relative retention time = ((retention time sulfate - void time) - (retention time sulfite - void time)) / (retention sulfate - void time)

ELECTROSTATICALLY BOUND HYPERBRANCHED ANION EXCHANGE SURFACE COATING PREPARED VIA CONDENSATION POLYMERIZATION USING DITERTIARY AMINE LINKERS FOR IMPROVED DIVALENT ANION SELECTIVITY

CROSS-REFERENCE TO RELATED APPLICATION

This application is a nonprovisional of U.S. Provisional Application No. 61/451,989, filed on Mar. 11, 2011.

BACKGROUND OF THE INVENTION

The present invention relates to a coated ion exchange material suitable for use as a chromatography medium, and a method of forming and using this material.

In one form of liquid chromatography, columns are packed with a discrete organic polymer granule or particle medium having functionally active surfaces. Materials for performing liquid chromatography are known where only thin outer surfaces of the chromatographic support materials are available for active exchange of ions with liquid media. For example, Small, et al. U.S. Pat. No. 4,101,460 describes an ion exchange composition comprising an insoluble synthetic resin substrate having ion-exchanging sites on its available surface and a finely divided insoluble material microparticles) irreversibly attached to this substrate by electrostatic forces. An exemplified microparticle is formed from latex.

A disadvantage associated with the latex coating procedure is that it can take a substantial period of time, e.g., days or even weeks, to make an optimized packed column. Such procedures typically require applying the coating after the column is packed which increases the manufacturing time and labor compared to synthetic methods which can provide a finished product prior to packing. This is because the packing can be made more efficiently in large batches rather than on a column-by-column basis. Also, latex synthesis is generally limited to water insoluble monomers, significantly limiting the choice of available monomers.

Other particulate bed materials with ion exchange layering particles irreversibly bound to the outer surface of support particles are described in Barretto, U.S. Pat. No. 5,532,279. In one embodiment, Barretto describes forming a complex by contacting a suitable dispersant with monomer in an aqueous solution in which the monomer is insoluble. Under suitable conditions for suspension polymerization, the monomer will polymerize to form resin support particles having a dispersant irreversibly attached to those particles. Fine synthetic layering particles are bound to the support particles. A number of other embodiments are disclosed for irreversible attachment.

Another form of ion chromatographic medium is made by forming a coating by binding a solution of a preformed polymer with saturated carbon chain backbones including leaving groups under hydrogen abstraction conditions to bind to preformed polymer to a substrate in the presence of a free-radical catalyst which removes leaving groups from the carbon chain to form the covalent bonds. See Srinivasan, U.S. Pat. No. 6,074,541. This coating is disclosed for use with a variety of substrates including the inner wall of a conduit or particles for use in a packed bed.

A significant application of ion chromatography is in analyzing water, e.g., surface water and well water. Worldwide, municipal facilities use ion chromatography to qualify water as being appropriate for human consumption. The ionic content of water varies significantly depending on the source, storage and handling conditions. In samples containing high levels of matrix ions such as chloride, sulfate and bicarbonate detecting trace amounts of ions such as bromate or chlorite or perchlorate is challenging.

Methods for ion analysis of water include direct injection and analysis, or pretreating the samples prior to a direct injection analysis. Direct injection is preferred, however, application of this method is limited for some samples with high matrix content due to the limited capacity of the stationary phases currently available. An alternate approach is to pursue pre-concentration of the ions in the sample in conjunction with heart cutting or some means of removing the matrix ions prior to analysis. Heart cutting methods are two-dimensional methods in which the matrix ions are separated or removed in the first dimension, enabling analysis of the ions of interest. Matrix ions are also removed using sample pretreatment with one or more pretreatment cartridges. For example a barium form cation exchange resin based cartridge is used to remove sulfate from the sample matrix. The methods discussed above are multi-step processes with multiple valve configurations, complex plumbing or are labor intensive. Therefore it is desirable to simplify the analysis protocol for samples containing matrix ions. Ion exchange phases having unique enhanced capacity architecture will facilitate analysis.

To counter some of the limitations of existing stationary phases a new phase and method of making this phase was recently introduced (U.S. Pat. No. 7,291,395), and has proven to be a powerful tool for use in chromatography. The stationary phase is formed by building up through condensation polymerization one or more layer on a substrate, each layer having selected structural and functional properties. However, thus far it hasn't been possible to use condensation polymers constructed in this manner for the separation of sulfite and sulfate.

U.S. Pat. No. 5,147,536 describes the use of chromatographic media prepared from ditertiary amines, however, the ditertiary amines used form a polymer with only two carbons between the two quaternary nitrogens in various cyclic structures, and the medium is not used to separate divalent anions. Moreover, the ditertiary amine acts as a cross-linking agent in the polymers compromising the ability to independently control selectivity and capacity during this synthesis. The high cross-linking such materials interferes with rapid mass transport rendering it unsuitable for high-performance analytical applications.

U.S. Pat. No. 4,373,031 describes preparation of anion exchange polymers using ditertiary amines through reaction with vinylbenzylchloride based polymer particles. This approach has the disadvantage set forth above because the ditertiary amine reagent acts as a cross-linking, reagent. Furthermore this patent provides no suggestion of the utility of such materials for improved divalent anion selectivity.

U.S. Pat. No. 5,204,376 describes preparation of anion exchange polymers using ditertiary amines through reaction with chloromethylated polystyrene fibers. Such material suffers from the same disadvantages as described above with the vinylbenzylchloride based polymer particles.

Four patents (U.S. Pat. No. 4,325,940, U.S. Pat. No. 4,089,977, U.S. Pat. No. 4,418,054 and U.S. Pat. No. 4,027,020) describe condensation polymers using 1,3-bis(dimethylamino)-2-propanol but all of these patents describe preparation of soluble polymers and none provide any suggestion of their utility for anion exchange or improving selectivity for divalent anions.

Two patents (U.S. Pat. No. 3,893,982 and U.S. Pat. No. 3,931,444) describe preparation of cured films 1,3-bis(dimethylamino)-2-propanol as the cure catalyst for epoxy containing polymers. In this case, the cured films contain acrylic acid rendering it useless for anion exchange preparations.

High capacity ion exchange phases should provide high resolution of species of interest, particularly dianions, e.g., sulfite and sulfate. Also desirable is an ion exchange stationary phase that provides a basis for separation of two or more dianions from each other, e.g., sulfite, sulfate, carbonate or thiosulfate. These phases should also allow separation and quantitation at trace levels of the separated ions. The present invention provides high capacity stationary phases capable of resolving dianions and methods of making and using them.

SUMMARY OF THE INVENTION

The present invention provides a new design for high capacity stationary phases for chromatography, for example, ion chromatography. The new stationary phase provides a chromatographic medium in which dianions, e.g., sulfate and sulfite can easily be separated. In an exemplary embodiment, these ions are resolved on the stationary phase of the invention using hydroxide eluent, and the stationary phase is stable under these basic conditions.

In an exemplary embodiment, the invention also provides a stationary phase and method for simultaneous analysis of two or more dianions, e.g., sulfate, sulfite, carbonate, and thiosulfate ions. Unlike previously investigated polymer systems capable of resolving sulfate and sulfite, which tend to produce poor peak shape for thiocyanate, the stationary phases of the present invention separate these three ions with good resolution and essentially symmetrical peak shape.

According to the present invention, it has now been discovered that condensation polymers formed with ditertiary amines, in which two or more tertiary amines are linked via a linker that is at least two carbons in length can provide baseline resolution of sulfate and sulfite ion.

In various embodiments, the stationary phase includes a "basement layer" or a "first layer," which terms are used herein interchangeably. The basement layer is formed from a different polymer than the higher order layers, which include quaternary amine moieties. The basement layer can include more than one branch point. An exemplary first or basement layer is formed from condensation polymerization of ammonia or a primary amine with a polyfunctional compound, e.g., a diepoxide. The first layer can be laid down on the substrate surface itself, or it can be laid down on (and optionally covalently bound or electrostatically attached to) a modified substrate surface. In various embodiments, the substrate surface is modified to impart positive or negative charge. For example, the substrate surface can be sulfonated or a polymer, such as poly(acrylic acid) can be deposited on the substrate surface to impart charge.

In various embodiments, the stationary phase includes at least a first quaternary amine polymer layer formed by condensation polymerization of at least one polytertiary amine with at least one polyfunctional compound containing amine-reactive functional groups. This layer is attached to and grows out of the first or basement layer discussed above. In various embodiments, the stationary phase is formed on a substrate made of a material other than the condensation polymer. In various embodiments, the polymer is formed on a substrate that includes a first polymer layer in contact with and at least partially coating the substrate of the stationary phase. The first polymer layer optionally includes a polymeric component formed by condensation polymerization of ammonia or a primary amine with at least one polyfunctional compound containing amine-reactive functional groups, or it can be formed from other precursors. In various embodiments, the polyfunctional moiety is a polyepoxide, e.g., a diepoxide.

In various embodiments, attaching a condensation polymer formed by condensation polymerization of at least one polytertiary amine with at least one polyfunctional compound to a substrate provides a novel stationary phase with unexpected chromatographic properties. In an exemplary embodiment, the resulting stationary phase is capable of separating divalent anions (e.g., two or more of sulfate, sulfite, thiosulfate and carbonate). For example, stationary phases of the invention are able to separate sulfate from sulfite with each component having analytically useful retention times. This and other improvements come without sacrificing the benefits of batch synthesis previously only available using graft polymerization. The synthesis method of the invention produces an ion chromatography medium with an unexpectedly high selectivity amongst divalent anions.

Condensation polymers can be formed from a wide variety of commercially available reagents to enable the preparation of materials of optimal selectivity for specific separation requirements. In exemplary embodiments, a first quaternary amine polymer layer and any prior or subsequent condensation polymer layers are applied to a substrate after a column is packed with the substrate, facilitating rapid screening of suitable coating chemistries. Furthermore, coatings can also be applied to the substrate under slurry conditions or in packed beds in order to provide suitable synthesis scale for large-scale production, minimizing manufacturing cost. The coating process can be interrupted at any stage in the reaction process for testing without interfering with the reaction process. The coating process can then be resumed based on intermediate test data.

In various embodiments in which the quaternary amine condensation polymer coating is based on the reaction product of a polyfunctional epoxide and a polyfunctional tertiary amine, the reaction product is UV transparent making it suitable for direct detection of analytes within the stationary phase provided the material is applied to a suitable UV transparent substrate.

In an exemplary embodiment, following the synthesis and attachment of the first quaternary amine condensation polymer layer on the substrate, the resulting coated substrate is modified by the attachment or growth and attachment of one or more additional condensation polymerization products on the coated substrate. In various embodiments, the additional condensation products include quaternary amines. In an exemplary embodiment, the additional condensation products are based on the same reaction as that used to form the first condensation polymer products, e.g., reaction between a polytertiary amine and an epoxide, creating a hyperbranched quaternary amine structure on top of the substrate or first polymer layer on the substrate. The identity of one or more reaction constituents can be varied from those used in the first condensation polymerization. One or more anchor points on the organic polymer chains of the first quaternary amine polymer layer (first generation) serve to attach the additional condensation polymer product to the substrate. The net result is a highly hyperbranched quaternary amine polymer structure that, in an exemplary embodiment, extends essentially uniformly on the surface of the substrate and provides excellent coverage of the substrate.

Due to the unique stationary phase architecture of the present invention, in which the substrate or first polymer layer provides many points for anchoring the hyperbranched quaternary amine structures, the solid phases are densely covered with a hyperbranched structure. Furthermore, in the stationary phases of the present invention the anchoring point for the highly branched structure is moved away from the surface of the substrate itself by interposing one or more condensation polymer layer between the substrate surface and the outer surface of the stationary phase. In various embodiments, one or more layers include one or more quaternary nitrogen moieties formed by reaction of a polytertiary amine moiety with a polyfunctional moiety having a reactive functional group reactive with a tertiary amine.

An exemplary method for preparing a stationary phase of the invention comprises, (a) reacting at least a first polyfunctional compound comprising two or more amine-reactive functional groups with a member selected from ammonia and a primary amine, forming a first polymer layer with a population of reactive amines; (b) reacting at least a portion of the population of reactive amines with a polyfunctional compound comprising two or more amine-reactive functional groups producing pendant amine-reactive functional groups. Step (b) results in the formation of a condensation polymer layer with quaternary amines and pendant amine-reactive functional groups.

An exemplary embodiment further includes (c) reacting the pendant amine-reactive functional groups with a polytertiary amine, forming a second quaternary amine condensation layer on the substrate. Step (c) results in the formation of a condensation polymer layer with reactive amines and quaternary amines. In various embodiments, (b) and/or (c) are repeated as many times as desired.

The present invention provides numerous advantages. For example hydrolytically stable polyquaternary amine ion exchange materials can be readily formed on a wide variety of substrates. Moreover, the present invention provides a quaternary amine-based chromatographic support having selectivity amongst divalent species, which is improved over prior stationary phases. For example, the material and methods of the invention make it straightforward to achieve baseline resolution of sulfite from sulfate (FIG. 1 compared to FIG. 5; and FIG. 9 compared to FIG. 13). Moreover, using prior stationary phases, the materials and methods of the present invention allow for the separation of carbonate from sulfate; however, resolution of carbonate from sulfate is often problematic with prior art anion exchange materials. Because carbonate is ubiquitous in the environment, good resolution of carbonate from sulfate is critical for good quantitation of sulfate. While a number of tools are available for removal of carbonate either before or after separation, with this invention it is now possible to achieve better separations of carbonate from sulfate than has been achieved in any other prior anion exchange material (e.g., FIG. 4, FIG. 11, FIG. 13, FIG. 14, FIG. 16).

Other embodiments, objects and advantages of the invention are apparent from the detailed description that follows.

BRIEF DESCRIPTION OF THE DRAWINGS

FIG. 30 is a tabulation of adjusted relative retention times for sulfate ion. The retention times are derived from chromatograms acquired by ion chromatography on stationary phases of the invention. The stationary phases are set forth in the examples and in the FIG.s.

DETAILED DESCRIPTION OF PREFERRED EMBODIMENTS

Figure 1:
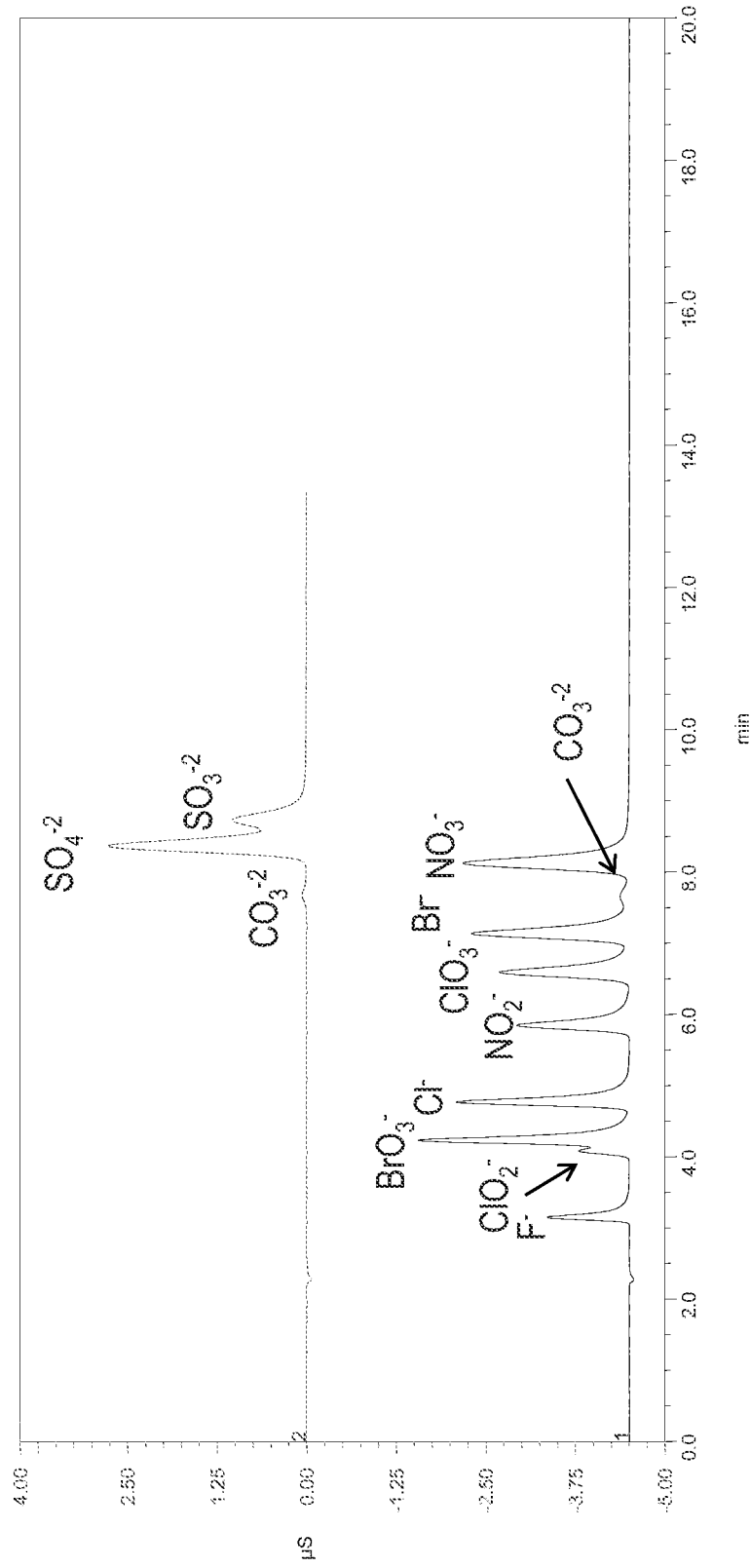
FIG. 1 is two chromatograms of two ion mixtures on an AS20 column showing sulfate eluting before sulfite and poor resolution of $SO_3^{2-}$, $SO_4^{2-}$, and $CO_3^{2-}$.
Figure 2:
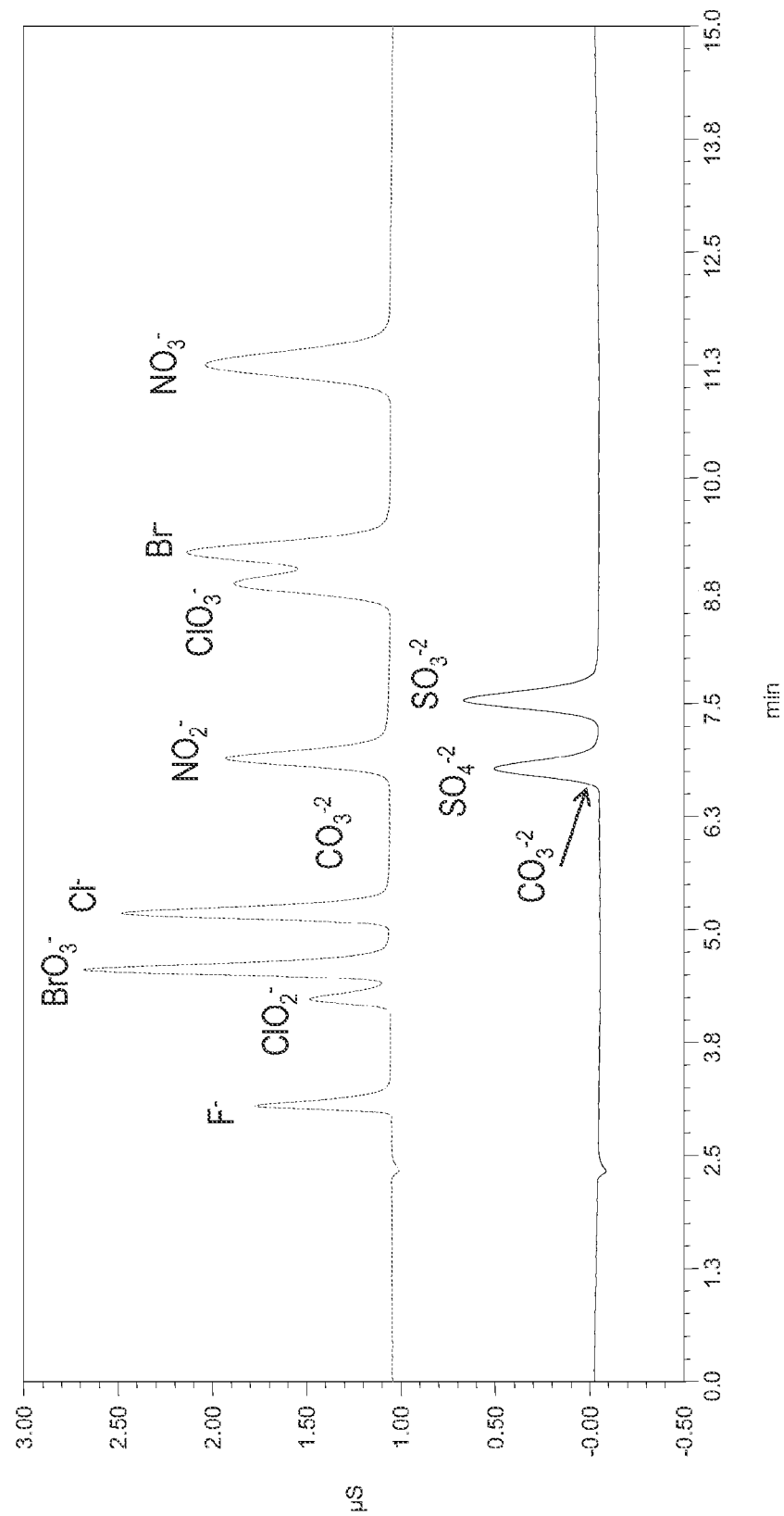
FIG. 2 is two chromatograms of two ion mixtures on an n-methylglucamine-based hyperbranched column showing sulfate eluting before sulfite. Note that while this primary amine reagent provides good resolution of sulfate and sulfite it provides poor resolution of sulfate and carbonate.
Figure 3:
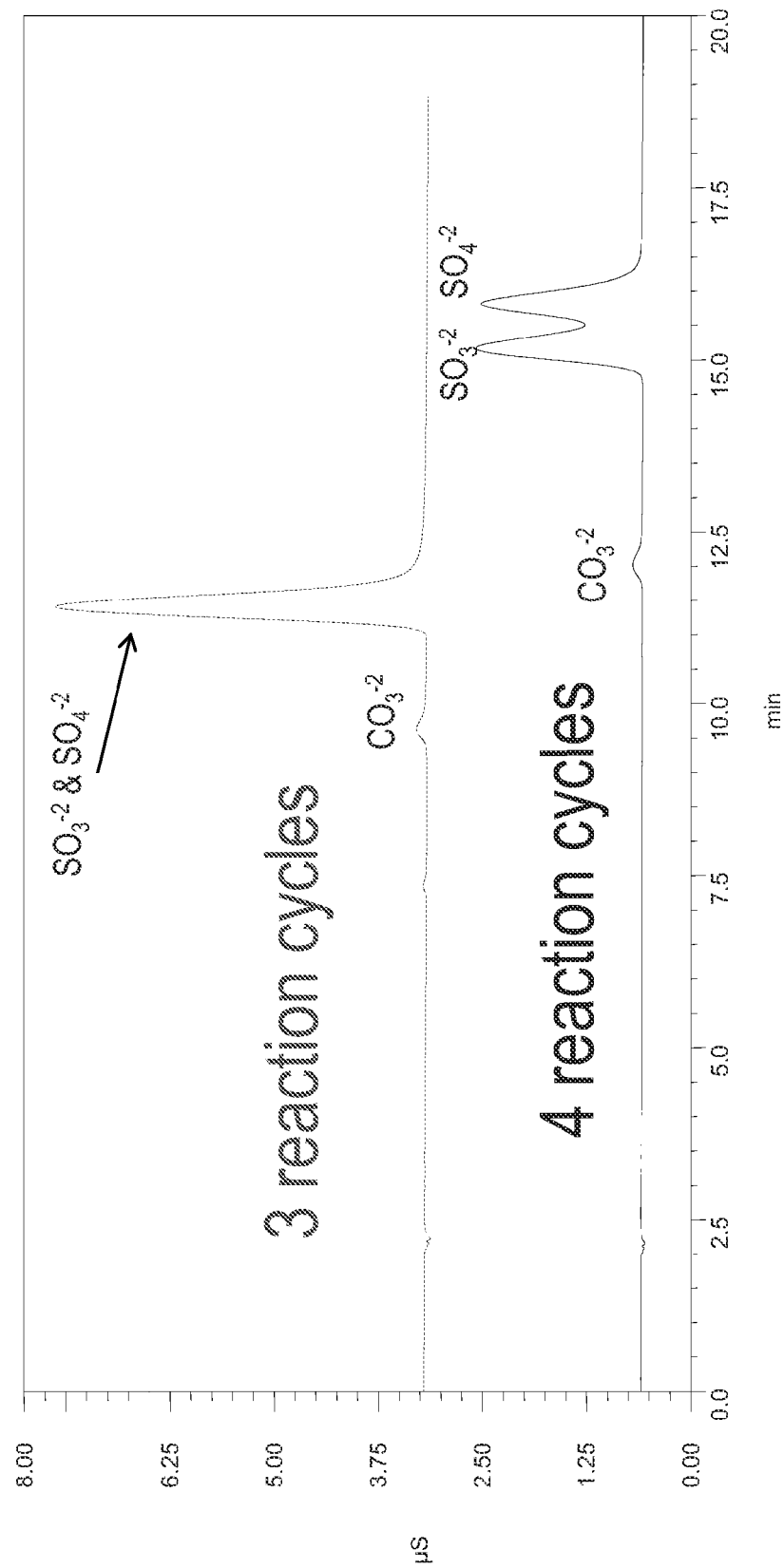
FIG. 3 is two chromatograms of an ion mixture on a dimethylamine based hyperbranched column showing selectivity for $SO_3^{2-}$, $SO_4^{2-}$, and $CO_3^{2-}$ after three and after four reaction cycles. Note that even after four reaction cycles $SO_3^{2-}$, $SO_4^{2-}$, are not completely resolved when the amine reagent is a secondary amine.
Figure 4:
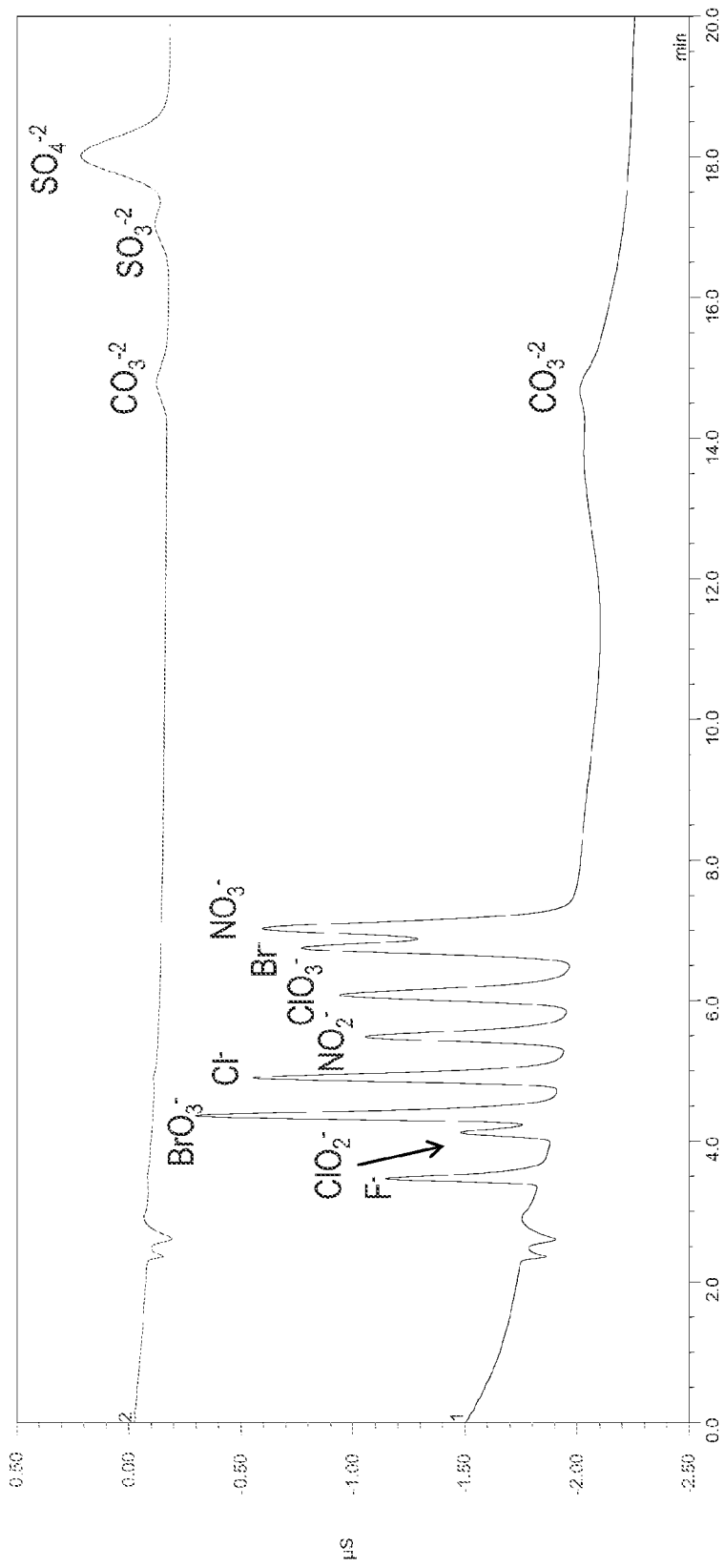
FIG. 4 is two chromatograms of two ion mixtures on an iminobisdimethylpropylamine-based hyperbranched column of the invention (two reaction cycles). Note reversal in order of elution of $SO_4^{2-}$ and $SO_3^{-}$ and improved resolution of $CO_3^{2-}$, $SO_3^{2-}$ and $SO_4^{2-}$.
Figure 4:
Figure 5:
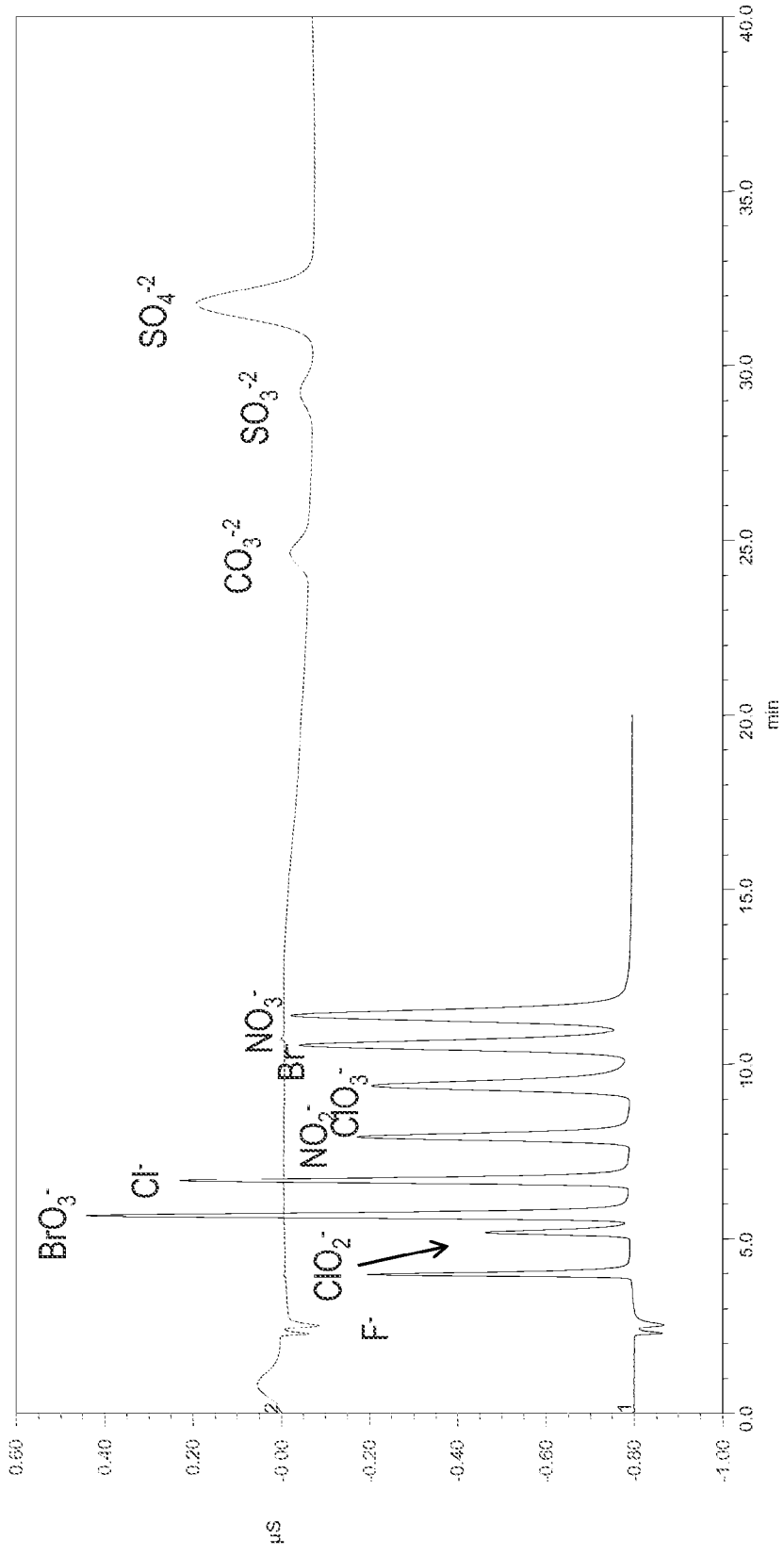
FIG. 5 is two chromatograms of two ion mixtures on an iminobisdimethylpropylamine-based hyperbranched column of the invention (three reaction cycles). Note reversal in order of elution of $SO_4^{2-}$ and $SO_3^{2-}$ and improved resolution of $CO_3^{2-}$, $SO_3^{2-}$ and $SO_4^{2-}$.
Figure 6:
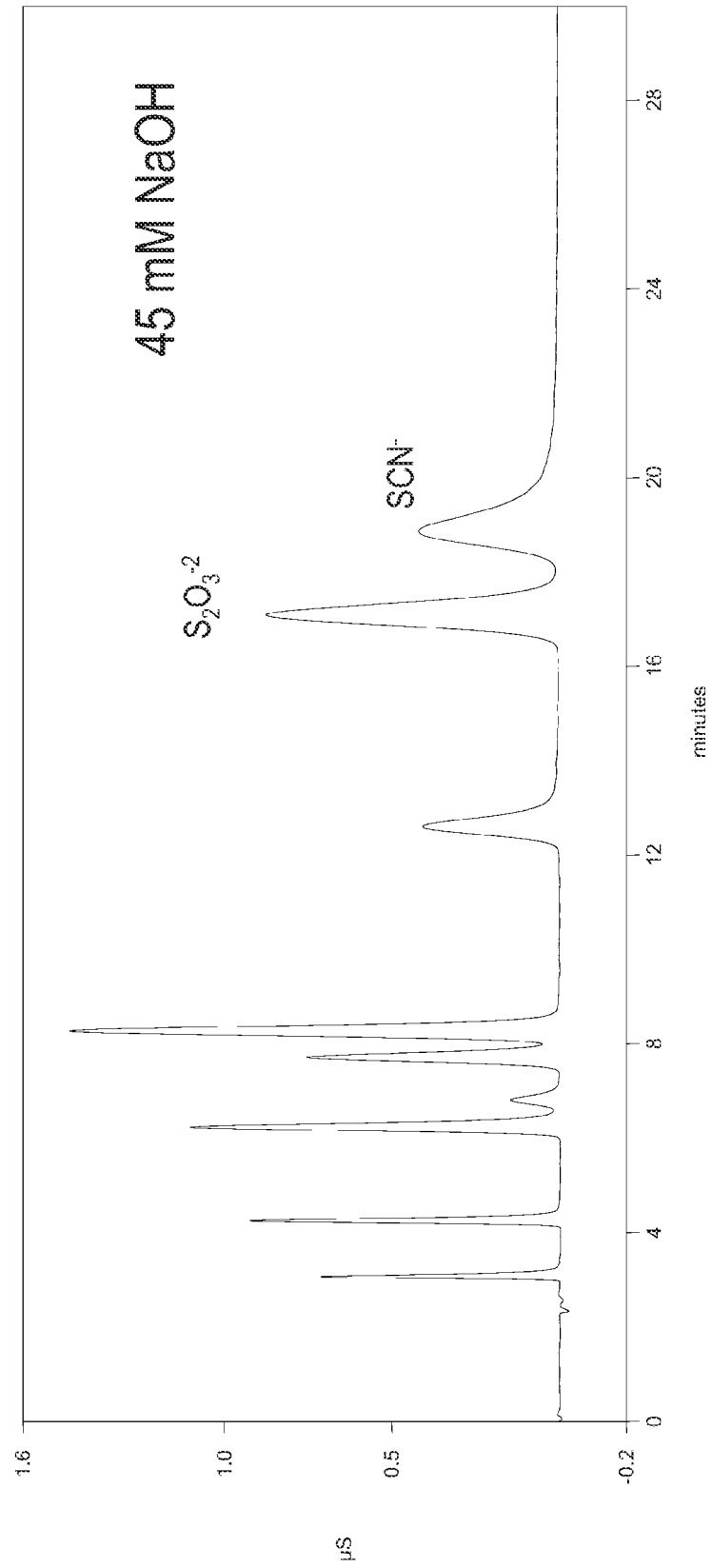
FIG. 6 is a chromatogram of an ion mixture on an iminobisdimethylpropylamine-based column of the invention. Note resolution of $S_2O_3^{-2-}$, $SCN^-$.

In various embodiments, the invention provides methods and devices allowing for superior resolution of sulfate and sulfite, sulfate and carbonate. In various embodiments, the invention provides superior performance for thiocyanate under conditions capable of resolving sulfate from sulfite. The aforementioned properties are obtained while still maintaining suitable hydroxide selectivity such that hydroxide can be used as an eluent for the above analytes.

In accordance with one embodiment of the present invention, there is provided a method for making an ion exchange coating (e.g., a chromatographic medium) on a substrate. An exemplary method for preparing a stationary phase of the invention comprises, (a) reacting at least a first polyfunctional compound comprising two or more amine-reactive functional groups with a member selected from ammonia and a primary amine, forming a first polymer layer with a population of reactive amines; (b) reacting at least a portion of the population of reactive amines with a polyfunctional compound comprising two or more amine-reactive functional groups producing pendant amine-reactive functional groups. Step (b) results in the formation of a condensation polymer layer with quaternary amines and pendant amine-reactive functional groups.

An exemplary embodiment further includes (c) reacting the pendant amine-reactive functional groups with a polytertiary amine forming a second quaternary amine condensation layer on the substrate. Step (c) results in the formation of a first quaternary amine condensation polymer layer. This layer also includes reactive tertiary amines.

In another exemplary embodiment, the invention provides a method for making a substrate supported ion exchange medium. The method includes (a), (b) and (c) as set forth above and (d) reacting a tertiary amine group in the product of (c) with a polyfunctional compound comprising two or more amine-reactive functional groups producing pendant amine-reactive functional groups. Step (d) forms a condensation polymer layer with quaternary amines and pendant amine-reactive functional groups.

In another exemplary embodiment, the method includes (a), (b), (c), (d) and (e) reacting the pendant amine-reactive functional groups with a polytertiary amine, thereby forming a second layer of a quaternary amine condensation polymer on said substrate.

In a further exemplary embodiment, the method of the invention includes (a), (b), (c), (d) and (e) above and further (I) in which a polyfunctional compound comprising two or more amine-reactive functional groups is reacted with a tertiary amine group in the product of (e) producing a condensation polymer layer with quaternary amines and pendant amine-reactive functional groups.

In various embodiments, the method of the invention include (a)-(f) above and further (g) reacting the pendant amine-reactive functional groups with a polytertiary amine, thereby forming a third layer of a quaternary amine condensation polymer on said substrate.

Figure 7:
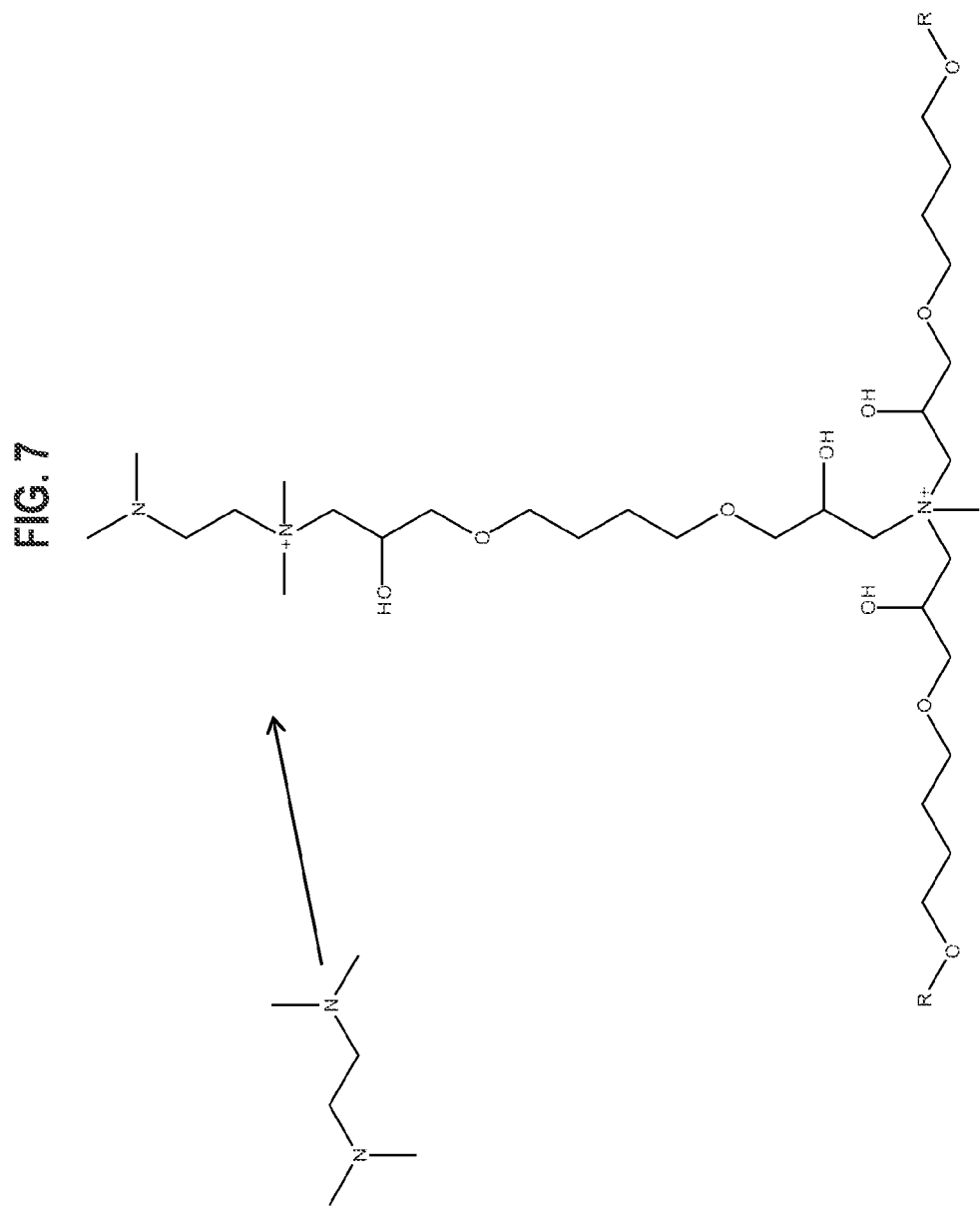
FIG. 7 shows exemplary polytertiary diamine reactions with diepoxide.
Figure 8:
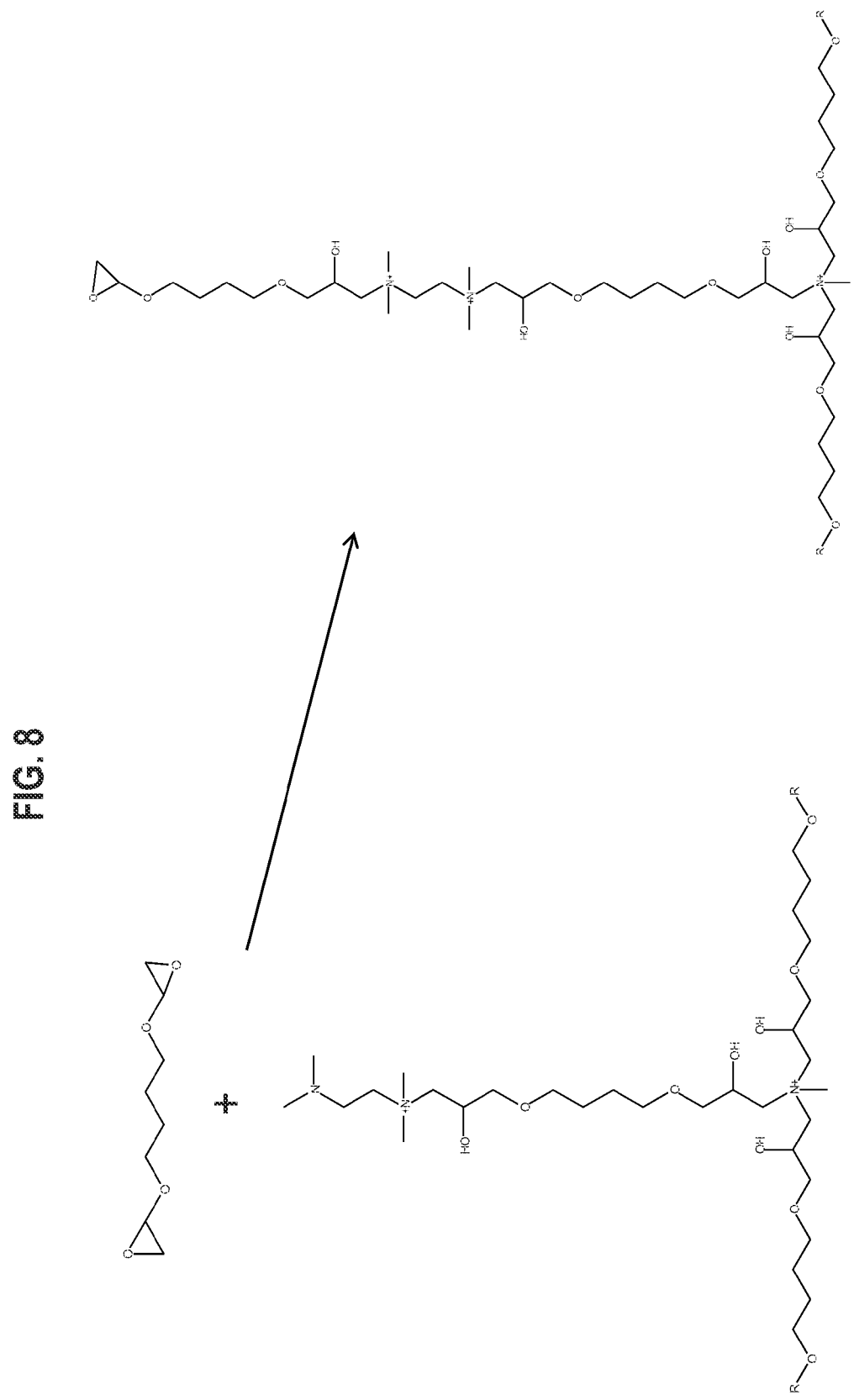
FIG. 8 shows polytertiary diamine reactions with diepoxide.
Figure 9:
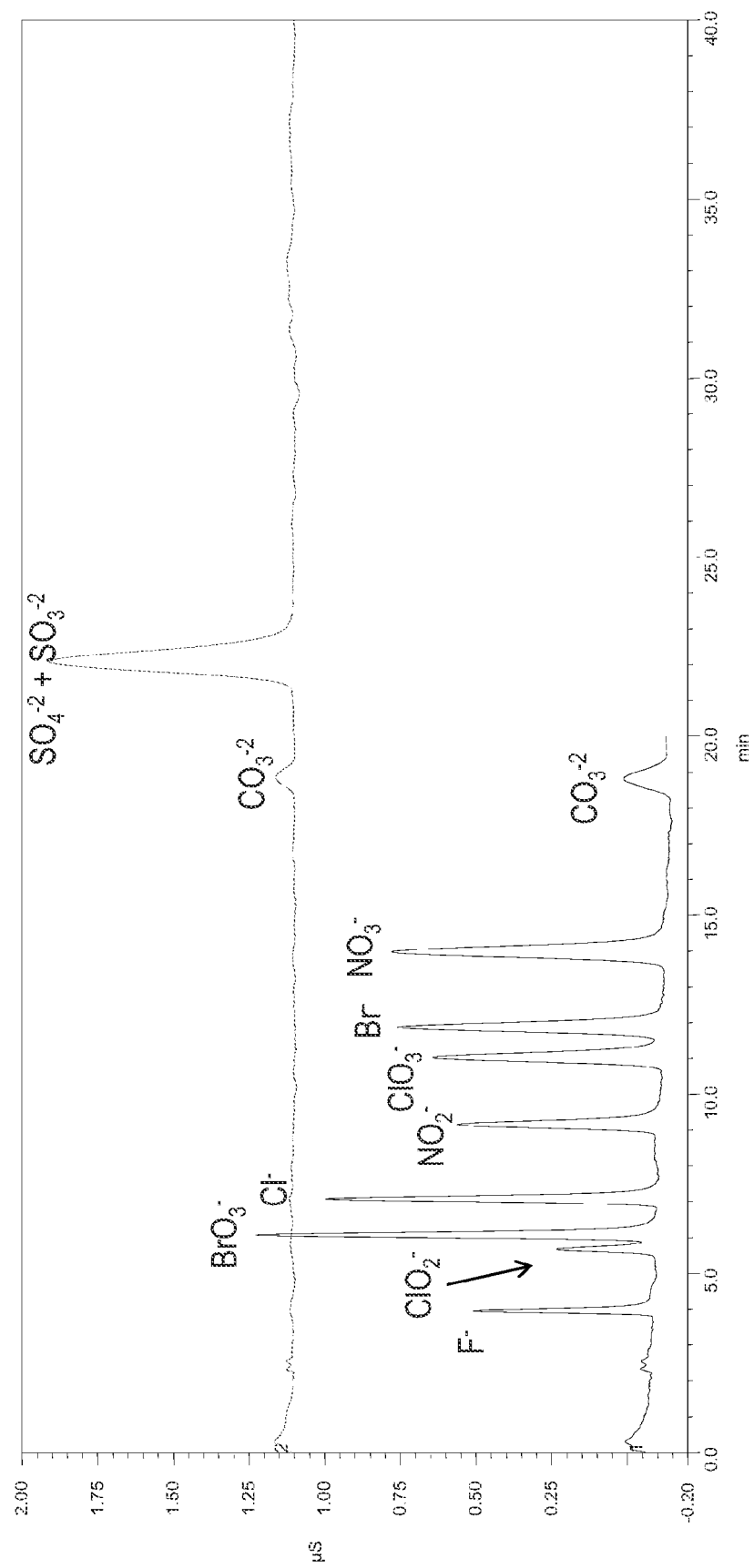
FIG. 9 is two chromatograms of two ion mixtures on a column of the invention prepared by a synthesis with tetramethylmethylenediamine after two reaction cycles. Note lack of resolution between $SO_4^{2-}$ and $SO_3^{2-}$.
Figure 10:
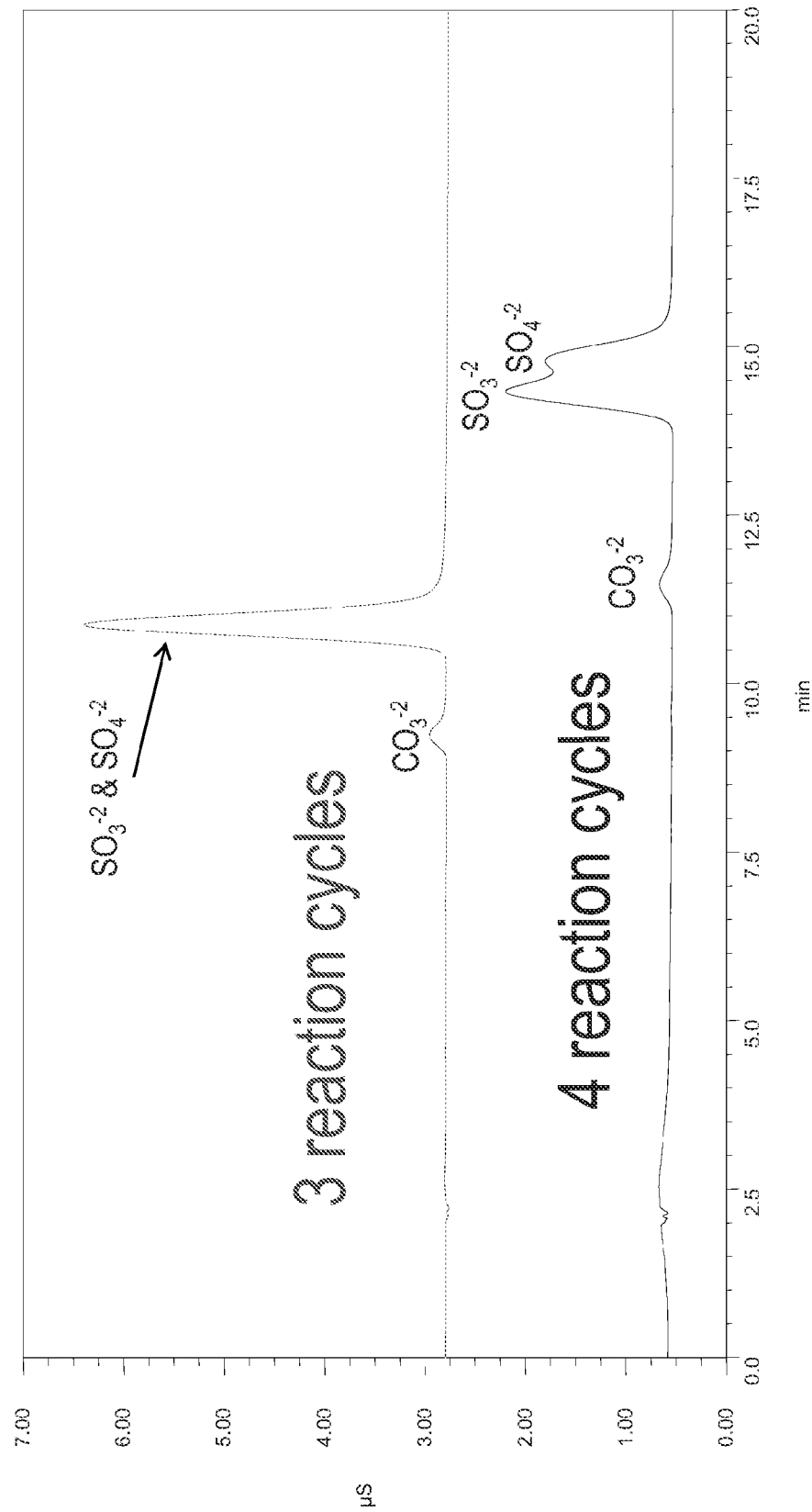
FIG. 10 is two chromatograms of an ion mixture on a column of the invention prepared by a synthesis with tetramethylmethylenediamine after three and four reaction cycles. Note continued lack of resolution between $SO_4^{2-}$ and $SO_3^{2-}$ after three reaction cycles and the relatively poor resolution between $SO_4^{2-}$ and $SO_3^{2-}$ after four reaction cycles.
Figure 11:
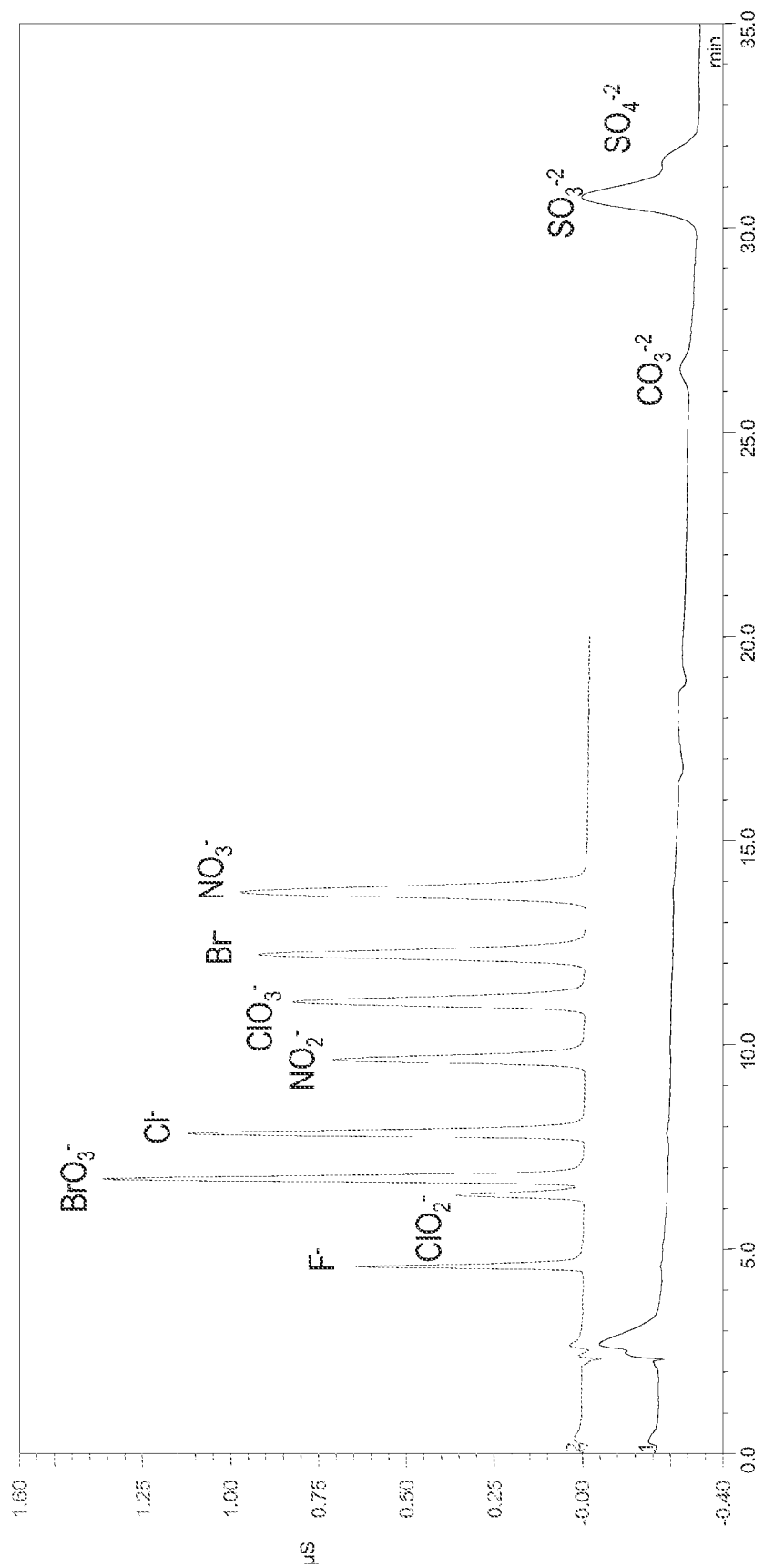
FIG. 11 is two chromatograms of two ion mixtures on a column of the invention prepared by a synthesis with tetramethylethylenediamine after two reaction cycles. Note nascent resolution of $SO_3^{2-}$ and $SO_4^{2-}$.
Figure 12:
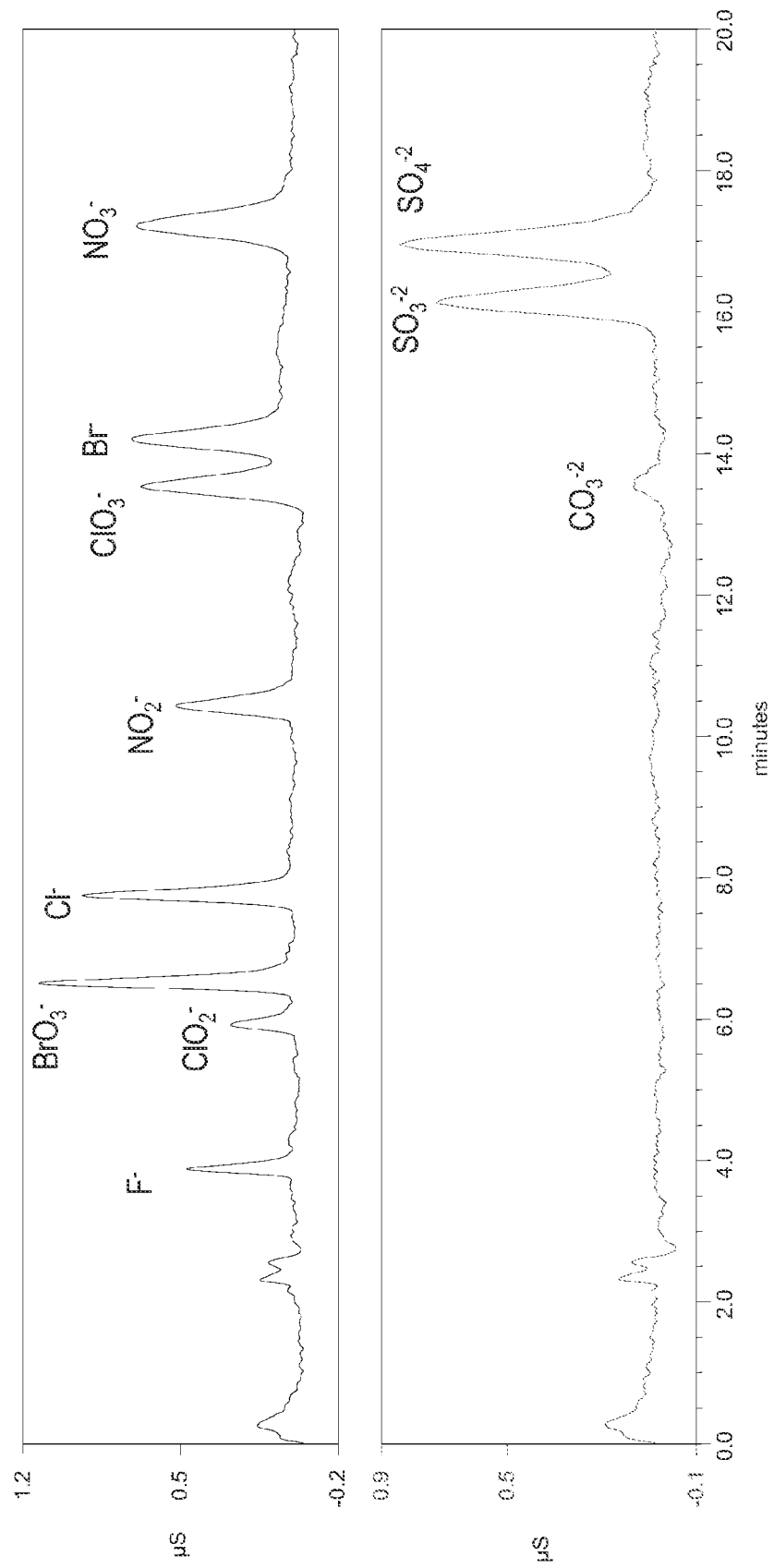
FIG. 12 is two chromatograms of two ion mixtures on a column of the invention prepared by a synthesis with tetramethylethylenediamine after three reaction cycles at 73° C. Note resolution of $SO_3^{2-}$ and $SO_4^{2-}$.
Figure 13:
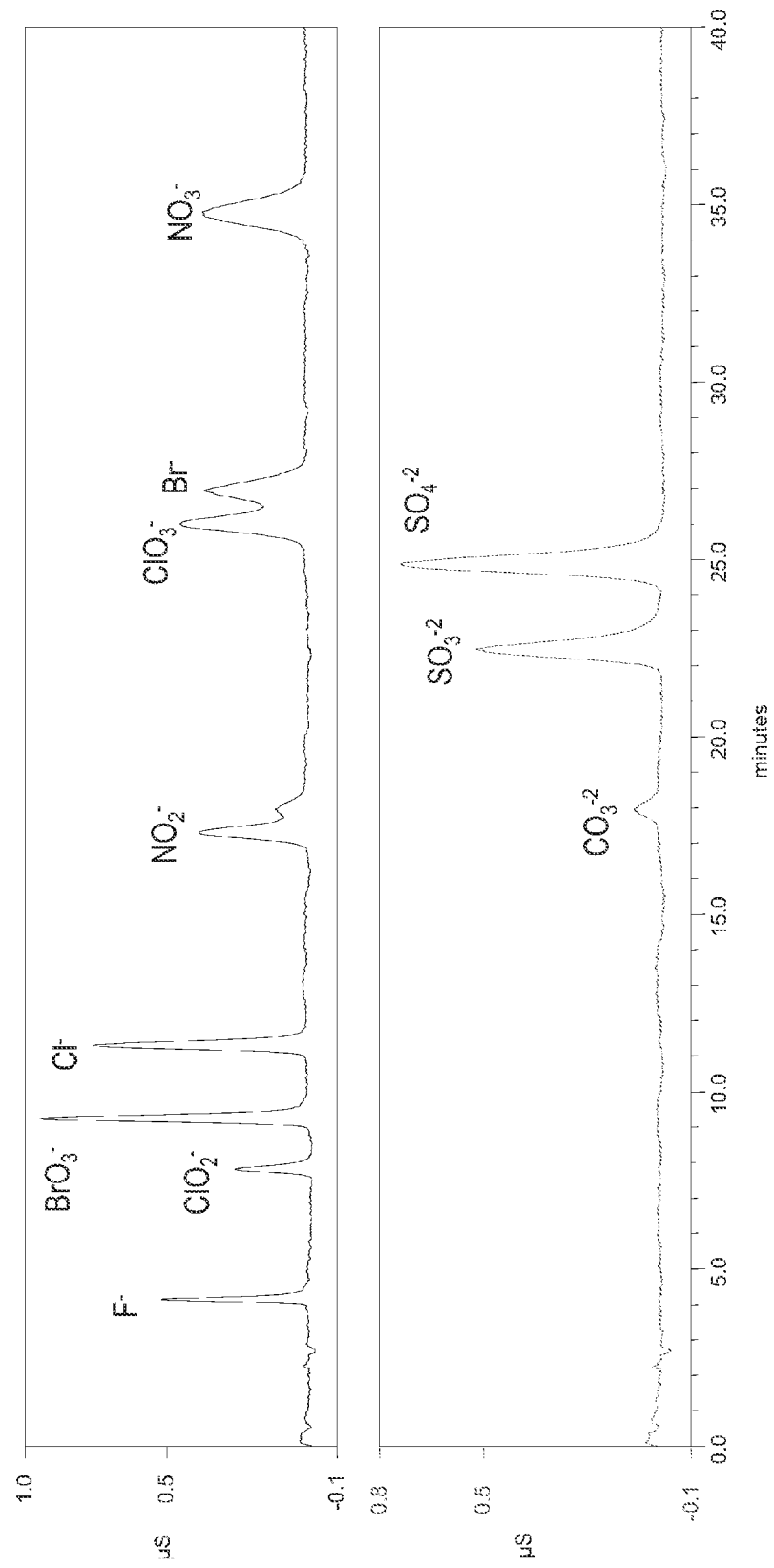
FIG. 13 is two chromatograms of two ion mixtures on a column of the invention prepared from a synthesis with tetramethylethylenediamine after four reaction cycles at 73° C. Note baseline resolution of $SO_3^{2-}$ and $SO_4^{2-}$.
Figure 14:
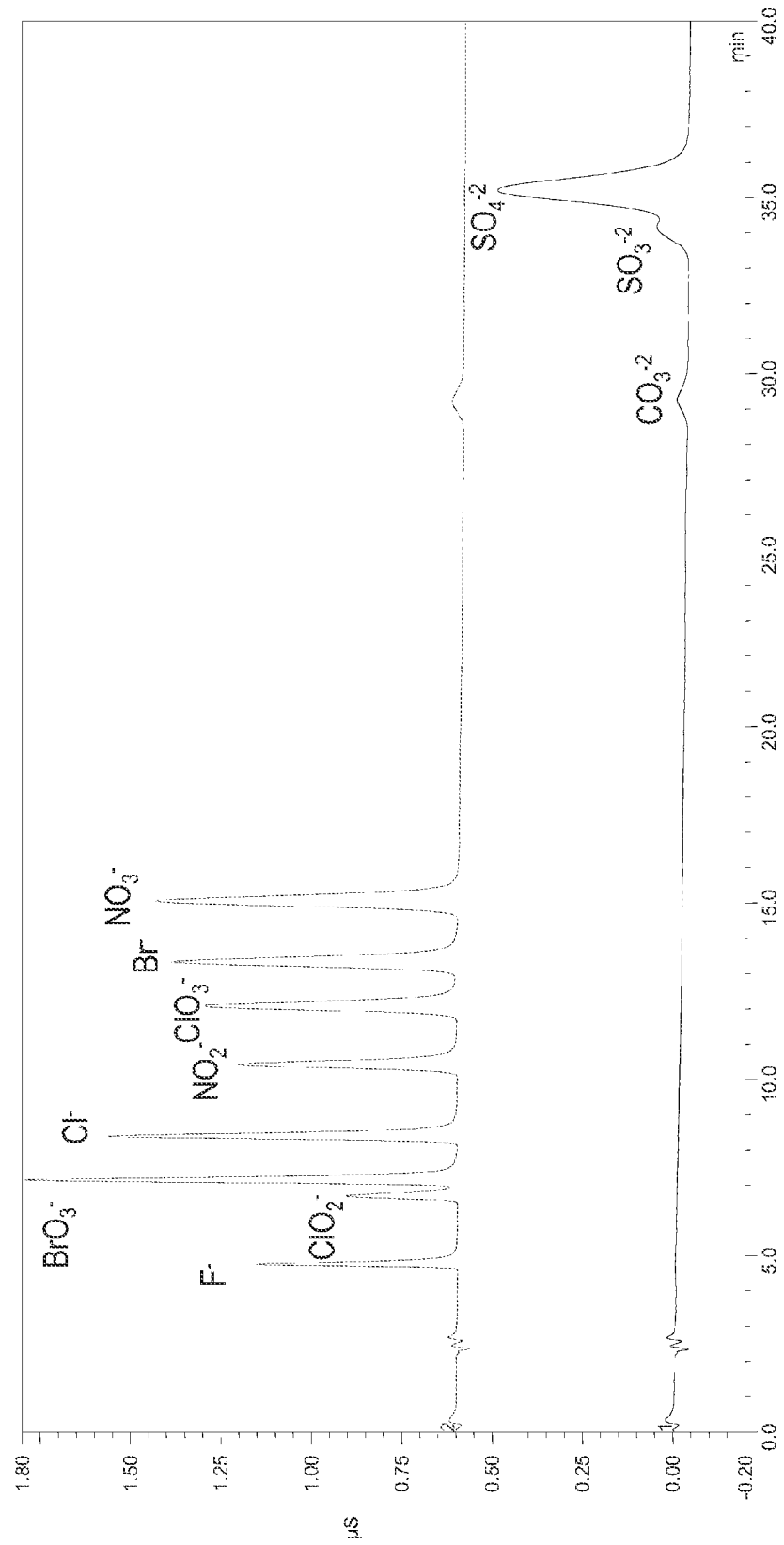
FIG. 14 is two chromatograms of two ion mixtures on a column of the invention prepared from a synthesis with tetramethyldiaminopropane after two reaction cycles. Note nascent resolution of $SO_3^{2-}$ and $SO_4^{2-}$.
Figure 15:
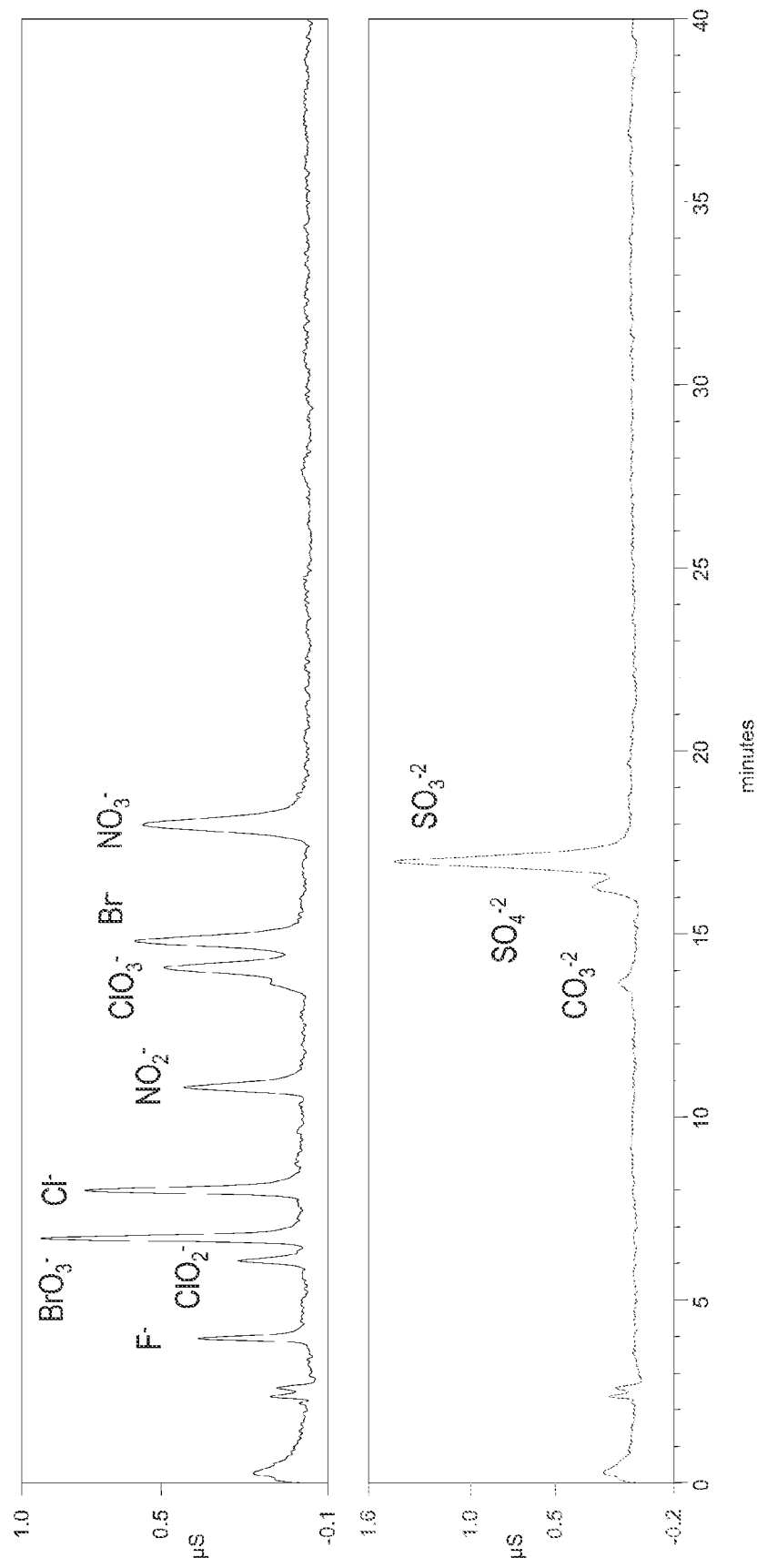
FIG. 15 is two chromatograms of two ion mixtures on a column of the invention prepared from a synthesis with tetramethyldiaminopropane after three reaction cycles at 73° C. Note nascent separation of $SO_4^{2-}$ and $SO_3^{2-}$.
Figure 16:
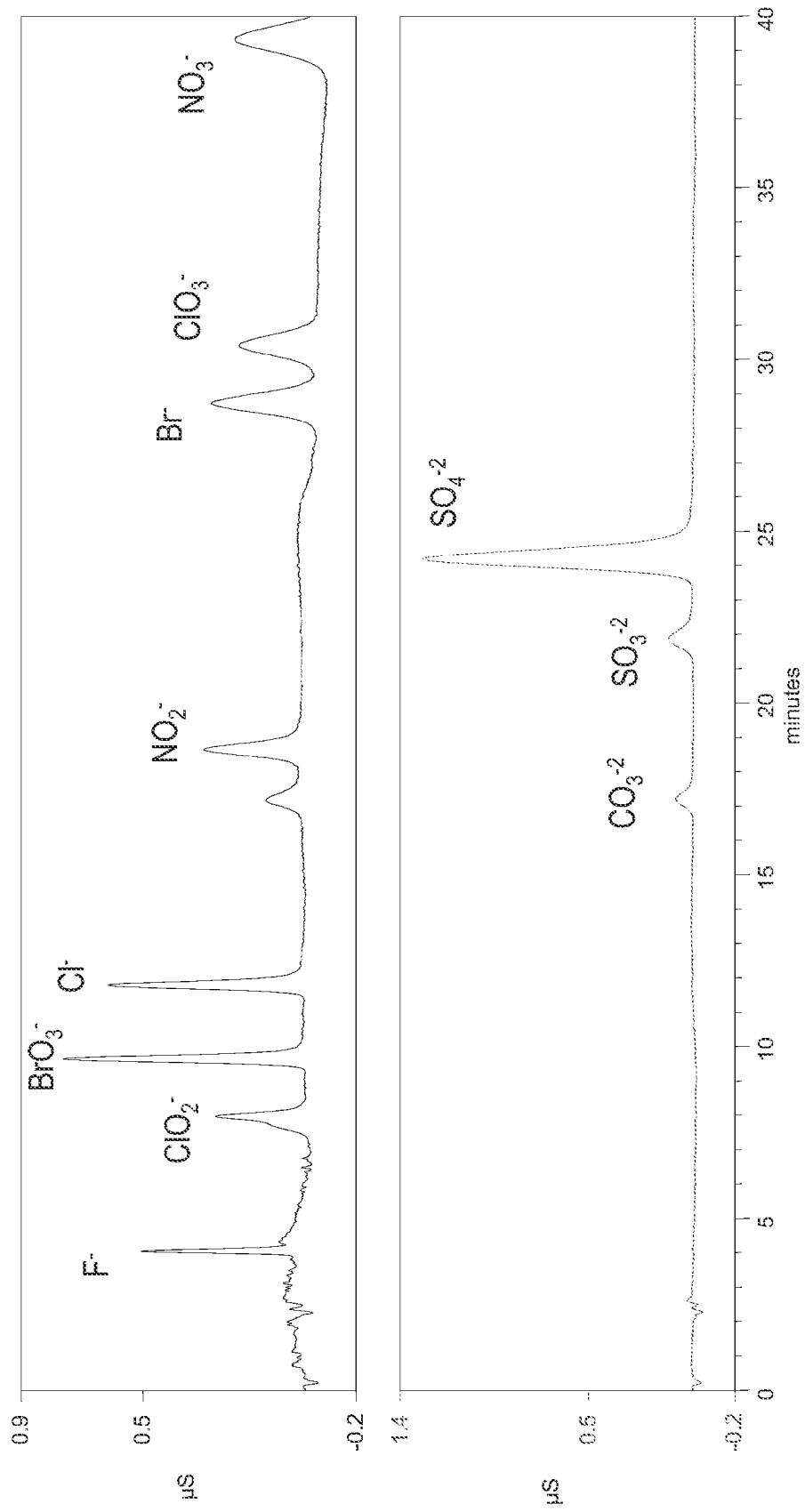
FIG. 16 is two chromatograms of two ion mixtures on a column of the invention prepared from a synthesis with tetramethyldiaminopropane after 3.5 reaction cycles at 73° C. Note separation of $SO_3^{2-}$ and $SO_4^{2-}$.
Figure 17:
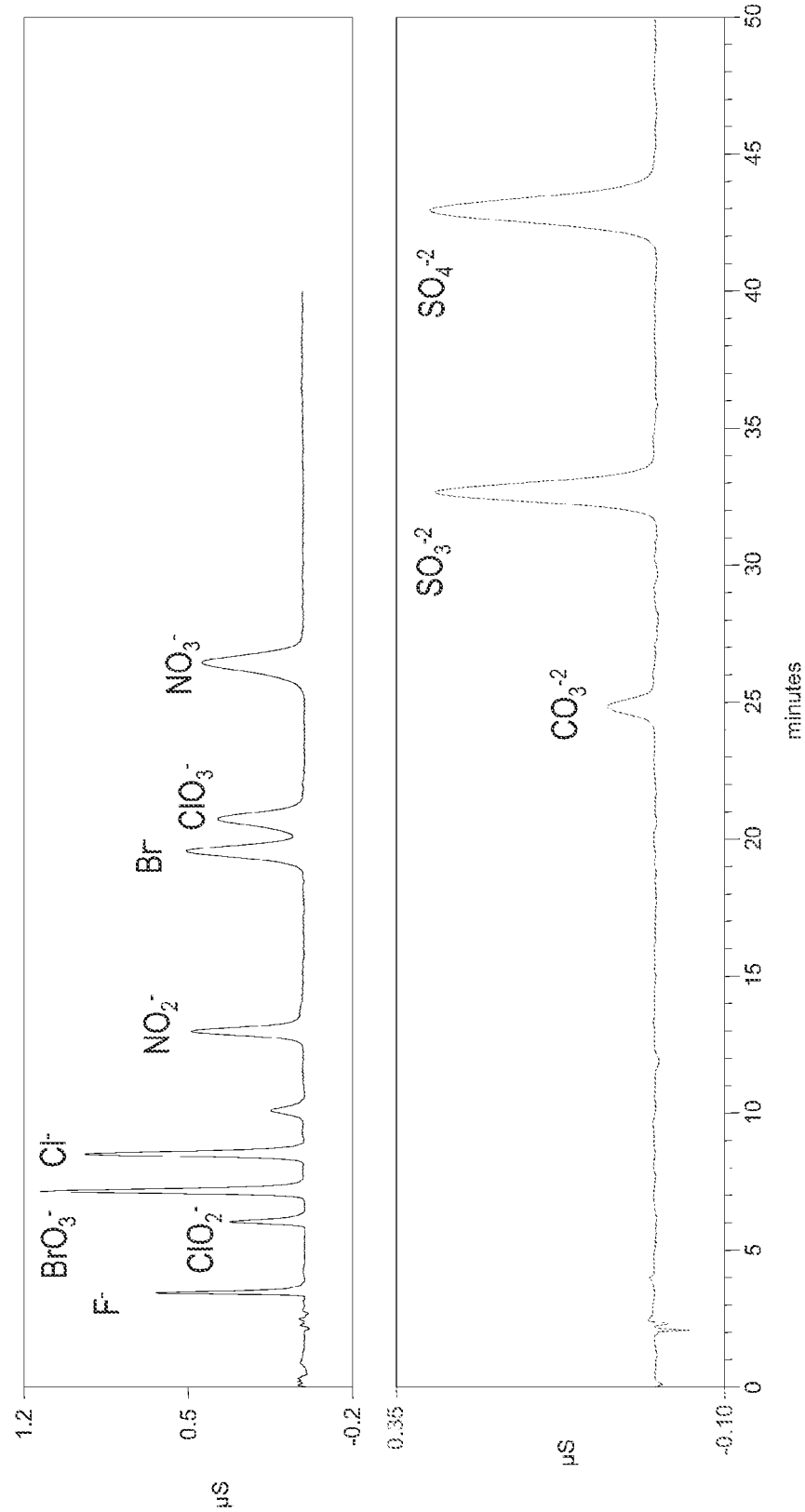
FIG. 17 is two chromatograms of two ion mixtures on a column of the invention prepared from a synthesis with tetramethyldiaminobutane after 3.5 reaction cycles at 73° C. Note baseline separation of $CO_3^{2-}$, $SO_3^{2-}$ and $SO_4^{2-}$.
Figure 18:
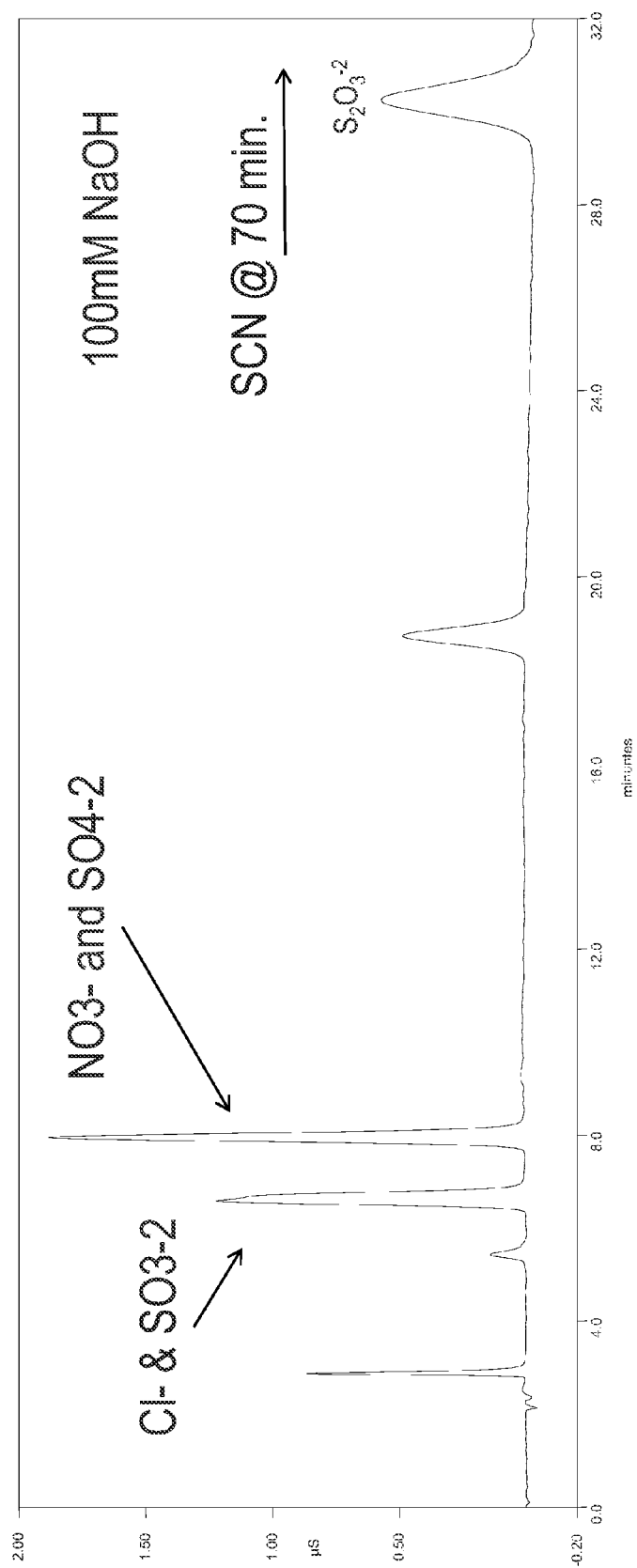
FIG. 18 is a chromatogram of an ion mixture on a column of the invention prepared from a synthesis with tetramethyldiaminobutane after 3.5 reaction cycles at 73° C. Note separation of $SO_3^{2-}$, $SO_4^{2-}$, $S_2O_3^{-2-}$ and $SCN^-$.
Figure 19:
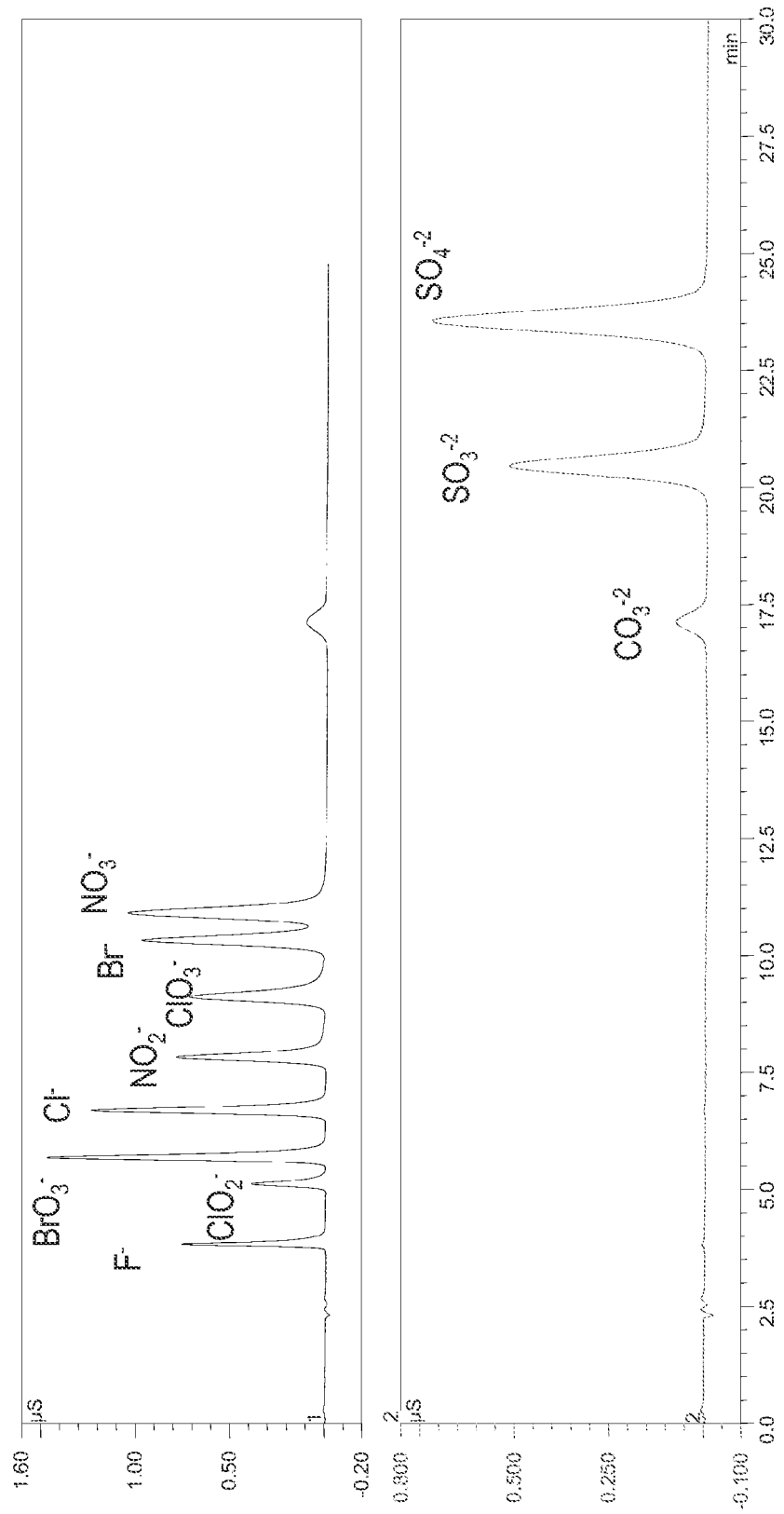
FIG. 19 is two chromatograms of two ion mixtures on a column of the invention prepared from a synthesis with tetramethyldiaminobutane after 3.5 reaction cycles at 65° C. Note baseline separation of $CO_3^{2-}$, $SO_3^{2-}$ and $SO_4^{2-}$.
Figure 20:
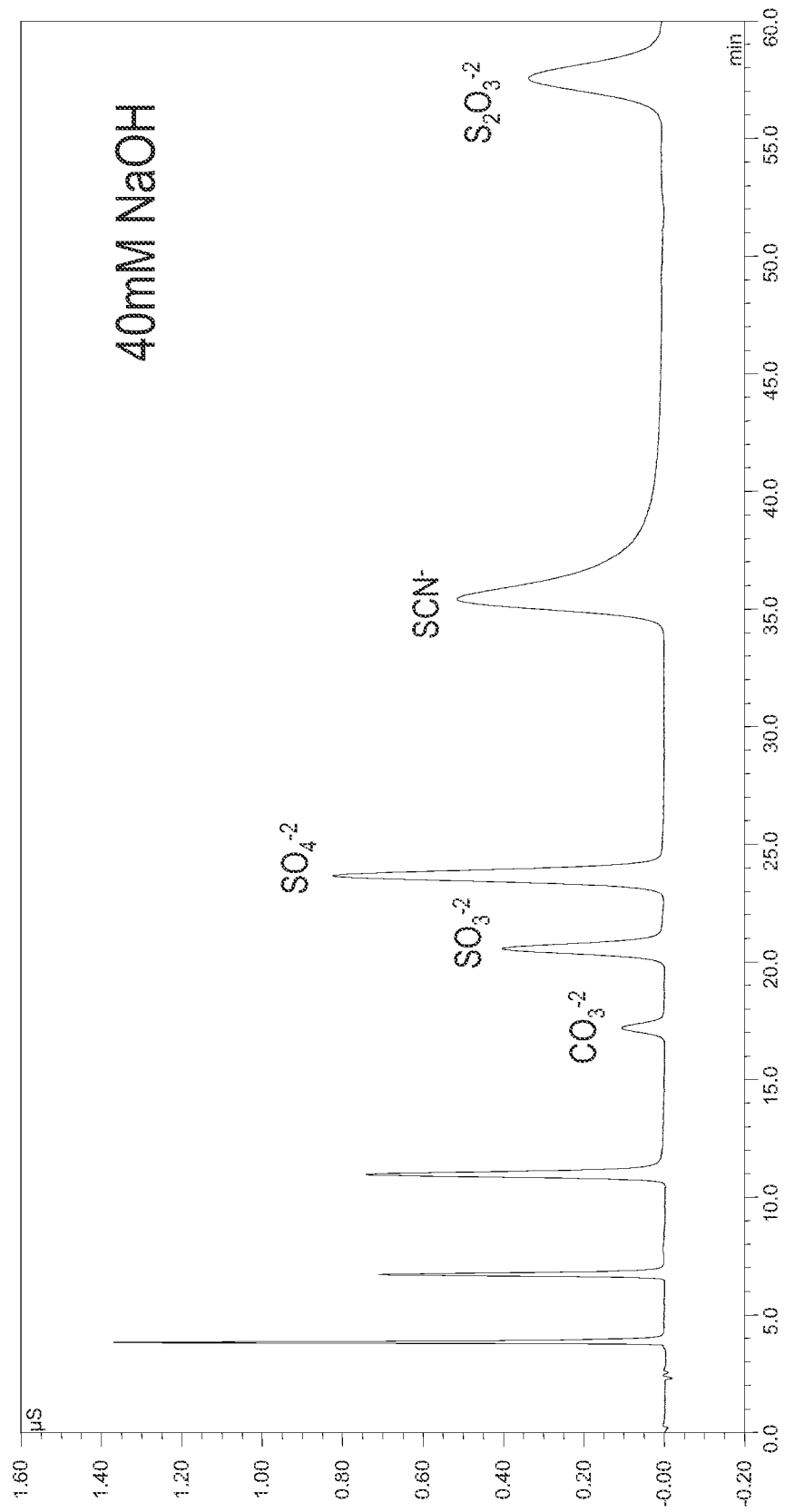
FIG. 20 is a chromatogram of an ion mixture on a column of the invention prepared from a synthesis with tetramethyldiaminobutane after 3.5 reaction cycles at 65° C. Note baseline separation of $CO_3^{2-}$, $SO_3^{2-}$, $SO_4^{2-}$, $SCN^-$ and $S_2O_3^{2-}$.
Figure 21:
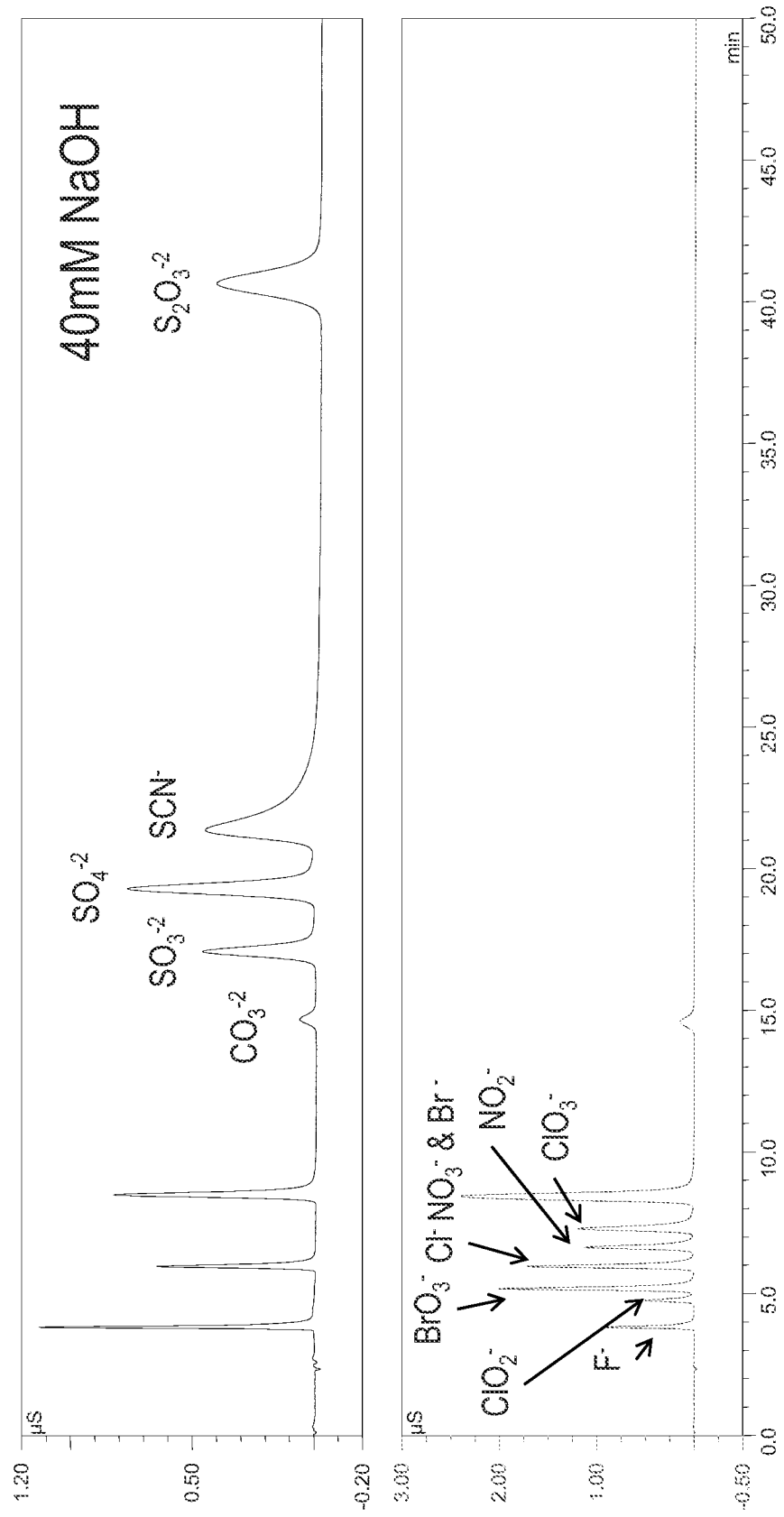
FIG. 21 is two chromatograms of two ion mixtures on a column of the invention prepared from a synthesis with tetramethyldiaminobutane after 3.5 reaction cycles at 60° C. Note baseline resolution of $SO_3^{2-}$ and $SO_4^{2-}$.
Figure 22:
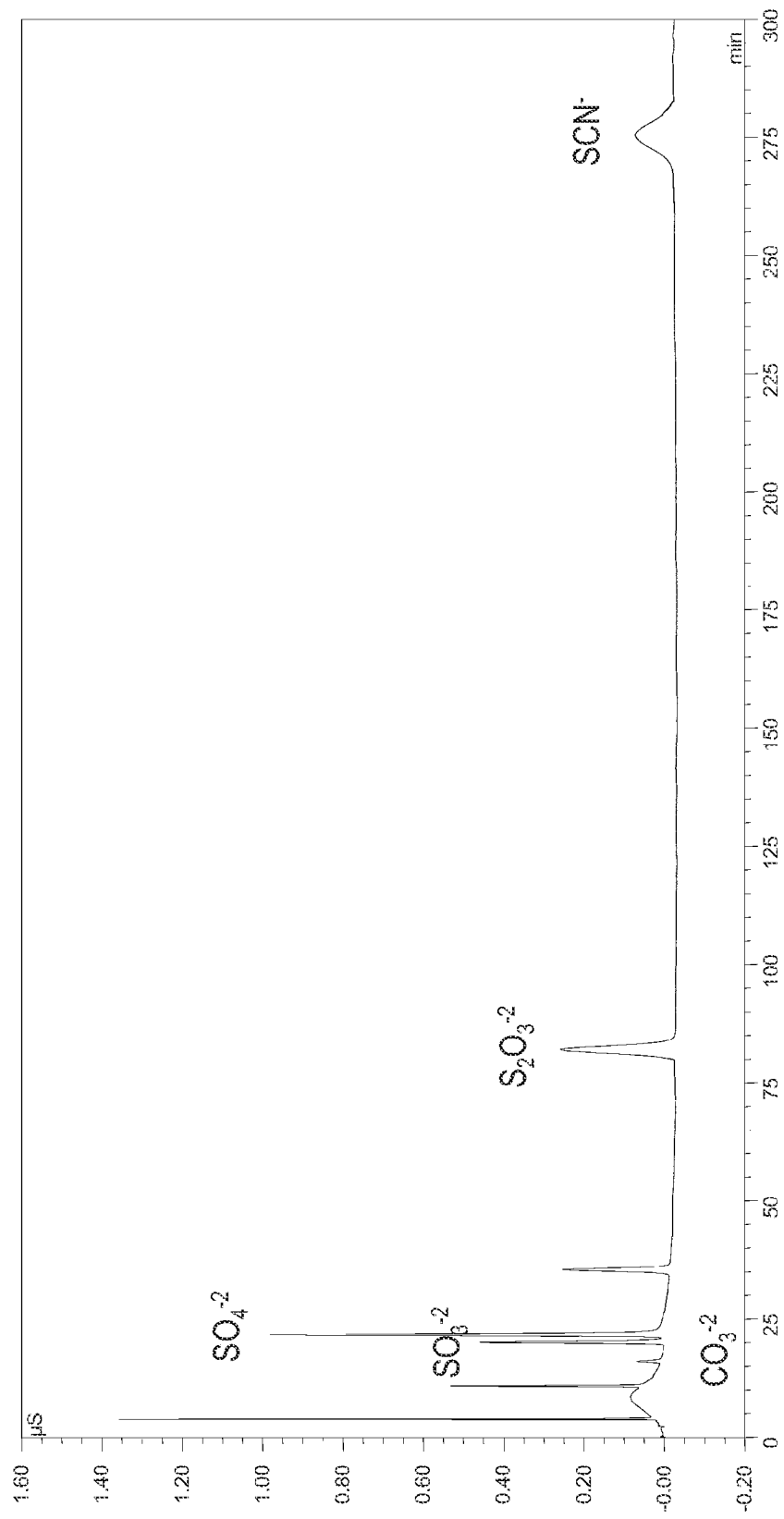
FIG. 22 is a chromatogram of an ion mixture on a column of the invention prepared from a synthesis with tetramethyldiaminopropane after 3.5 reaction cycles at 60° C. Note baseline separation of $CO_3^{2-}$, $SO_3^{2-}$, $SO_4^{2-}$, $SCN^-$, and $S_2O_3^{2-}$.
Figure 23:
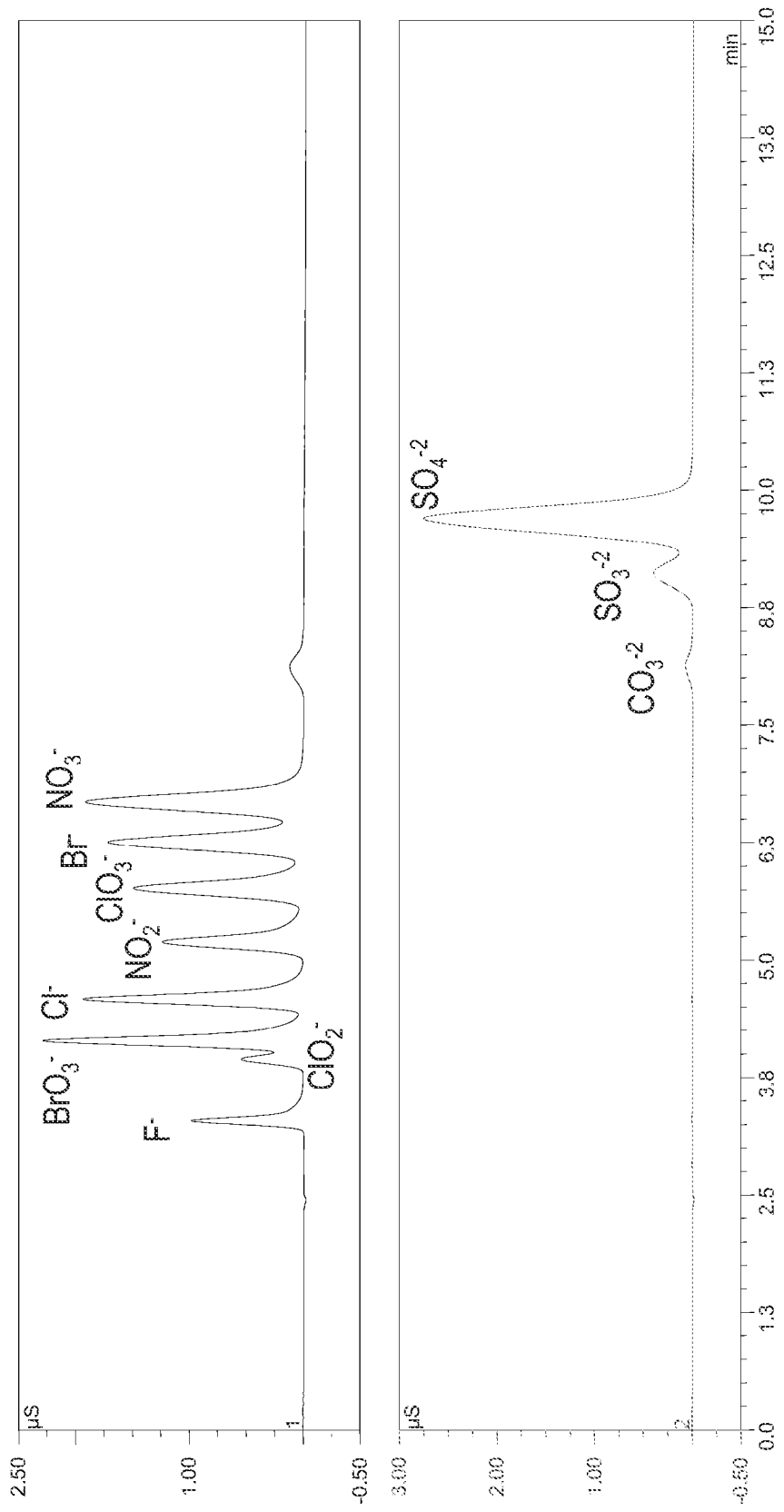
FIG. 23 is two chromatograms of two ion mixtures on a column of the invention prepared from a synthesis with tetramethyldiaminopropane after 3.5 and 0.5 reaction cycles at 65° C. Note baseline resolution of $SO_3^{2-}$ and $SO_4^{2-}$.
Figure 24:
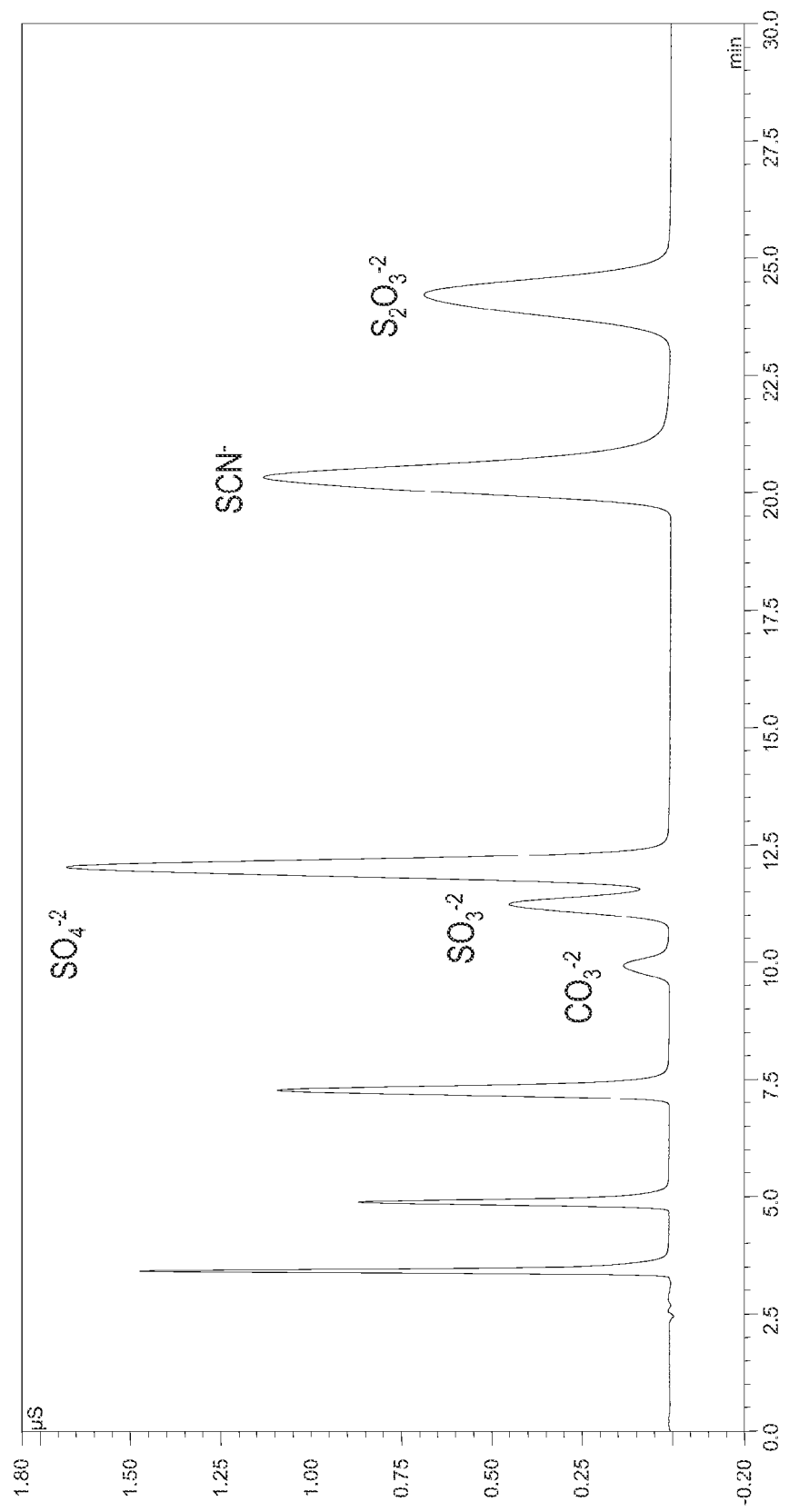
FIG. 24 is a chromatogram of an ion mixture on a column of the invention prepared from a synthesis with tetramethyldiaminopropane after 3.5 and 0.5 reaction cycles at 65° C. Note baseline resolution of $SO_3^{2-}$ and $SO_4^{2-}$.
Figure 25:
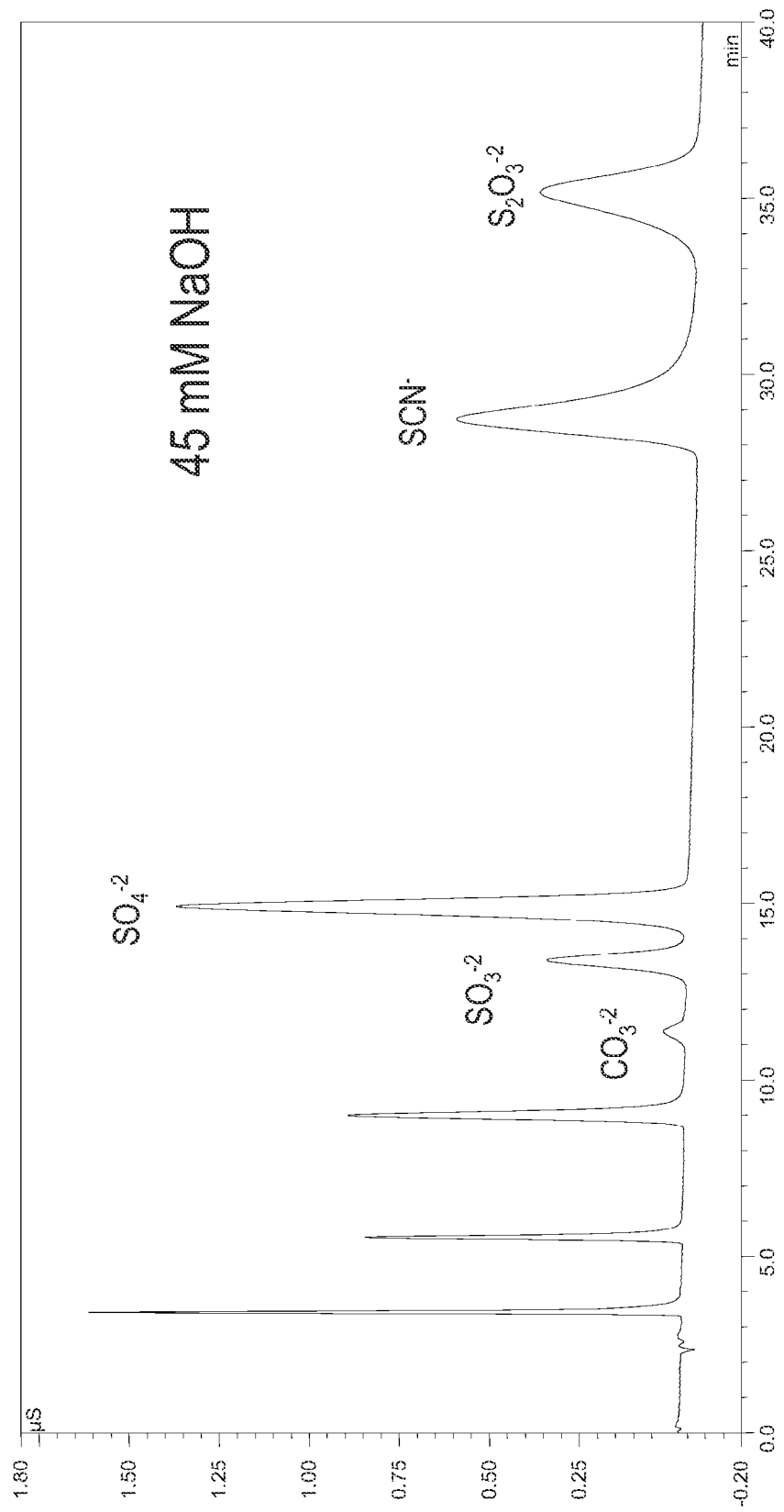
FIG. 25 is a chromatogram of an ion mixture on a column of the invention prepared from a synthesis with bis[2-(N,N-dimethylamino)ethyl]ether after 3.5 and 0.5 reaction cycles at 65°. Note baseline resolution of $CO_3^{2-}$, $SO_3^{2-}$, $SO_4^{2-}$, $SCN^-$ and $SO_3^{-2-}$.
Figure 26:
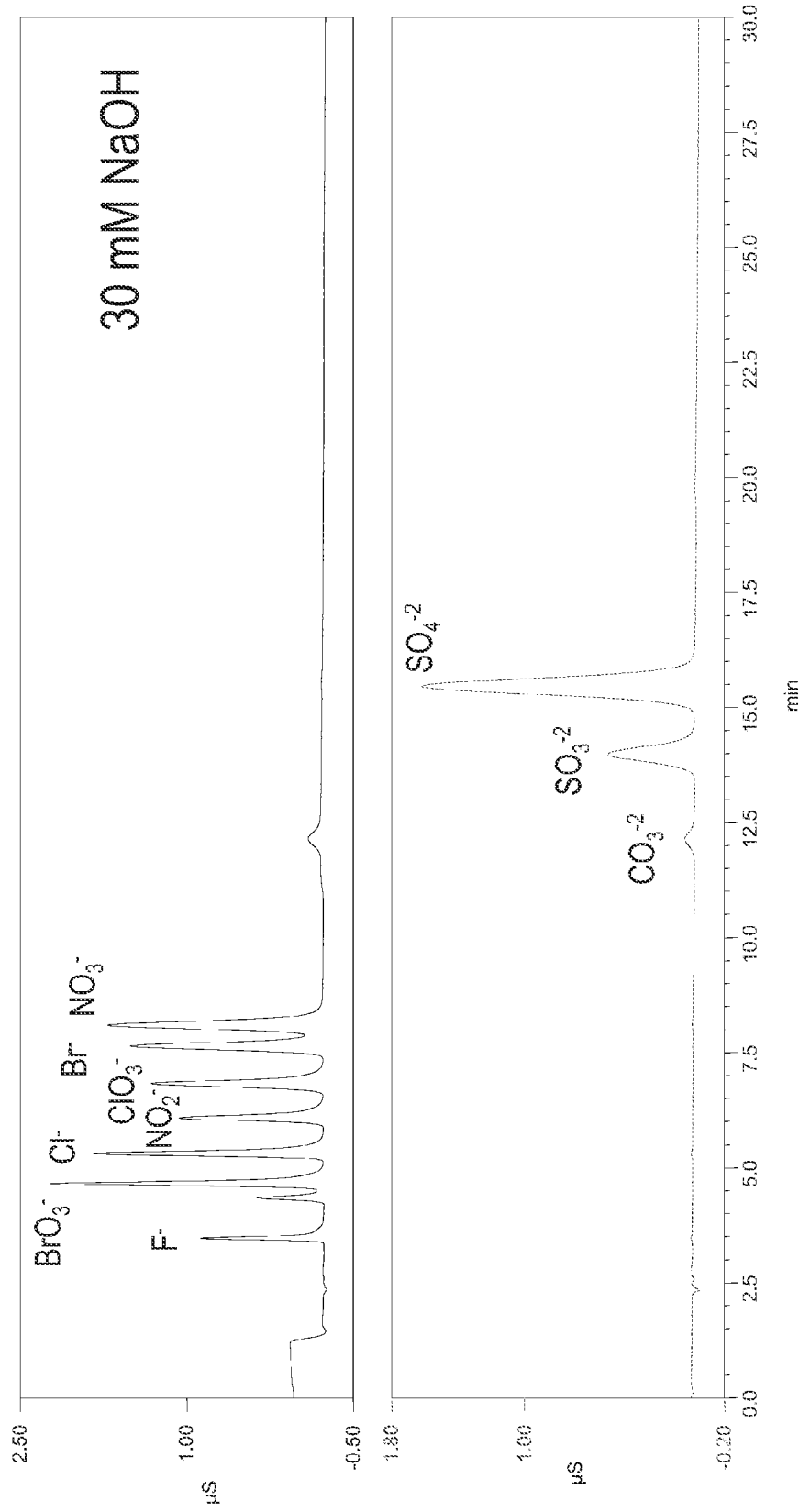
FIG. 26 is two chromatograms of two ion mixtures on a column of the invention prepared from a synthesis with 1,3-bis[dimethylamino)-2-propanal after 3.5 and 0.5 reaction cycles at 65° C. Note baseline resolution of $CO_3^{2-}$, $SO_3^{2-}$ and $SO_4^{2-}$.
Figure 27:
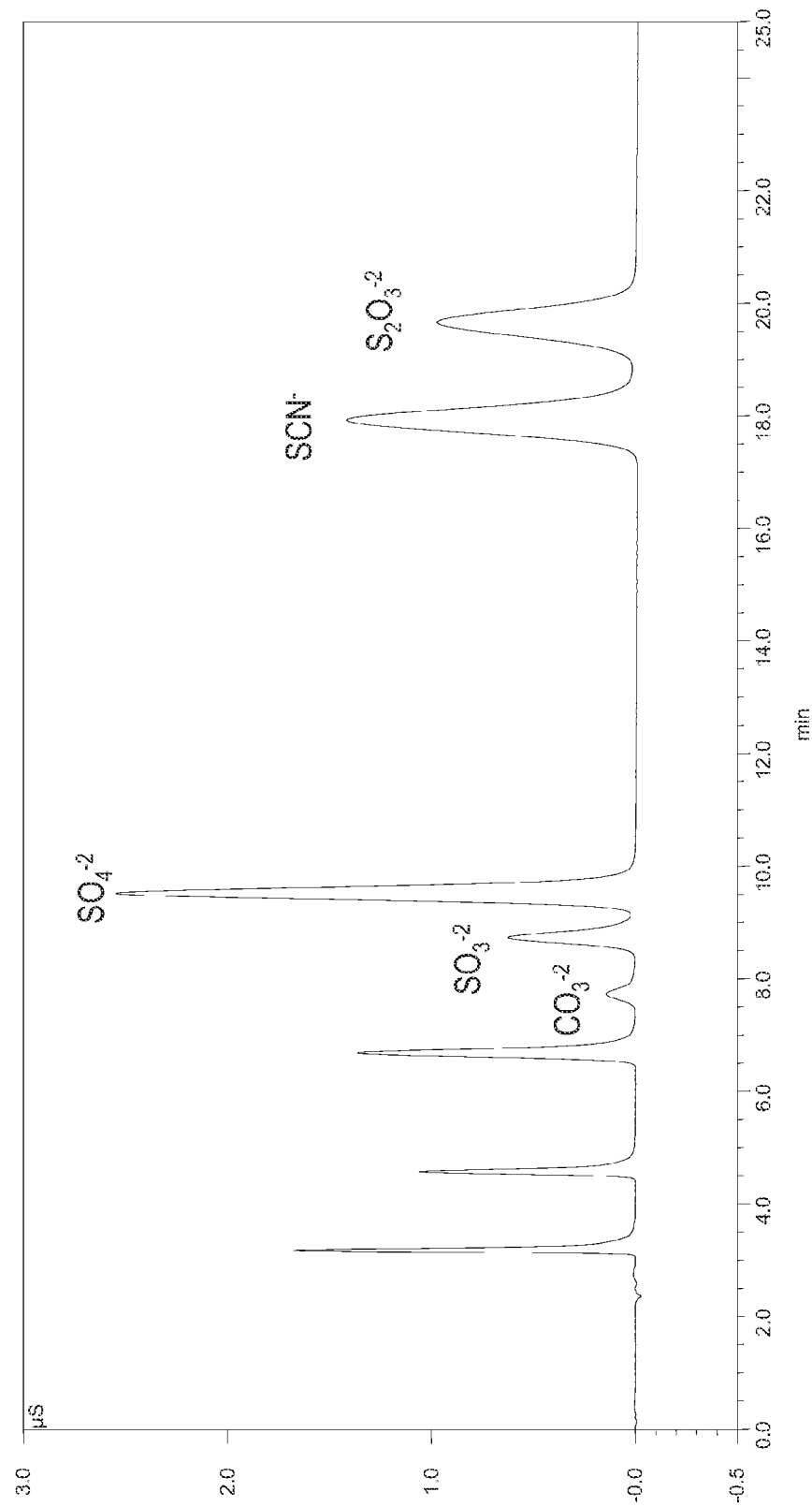
FIG. 27 is a chromatogram of an ion mixture on a column of the invention prepared from a synthesis with 1,3-bis[dimethylamino)-2-propanol after 3.5 and 0.5 reaction cycles at 65° C. using 1M. Note baseline resolution of $CO_3^{2-}$, $SO_3^{2-}$, $SO_4^{2-}$, $SCN^-$ and $S_2O_3^{-2-}$.
Figure 28:
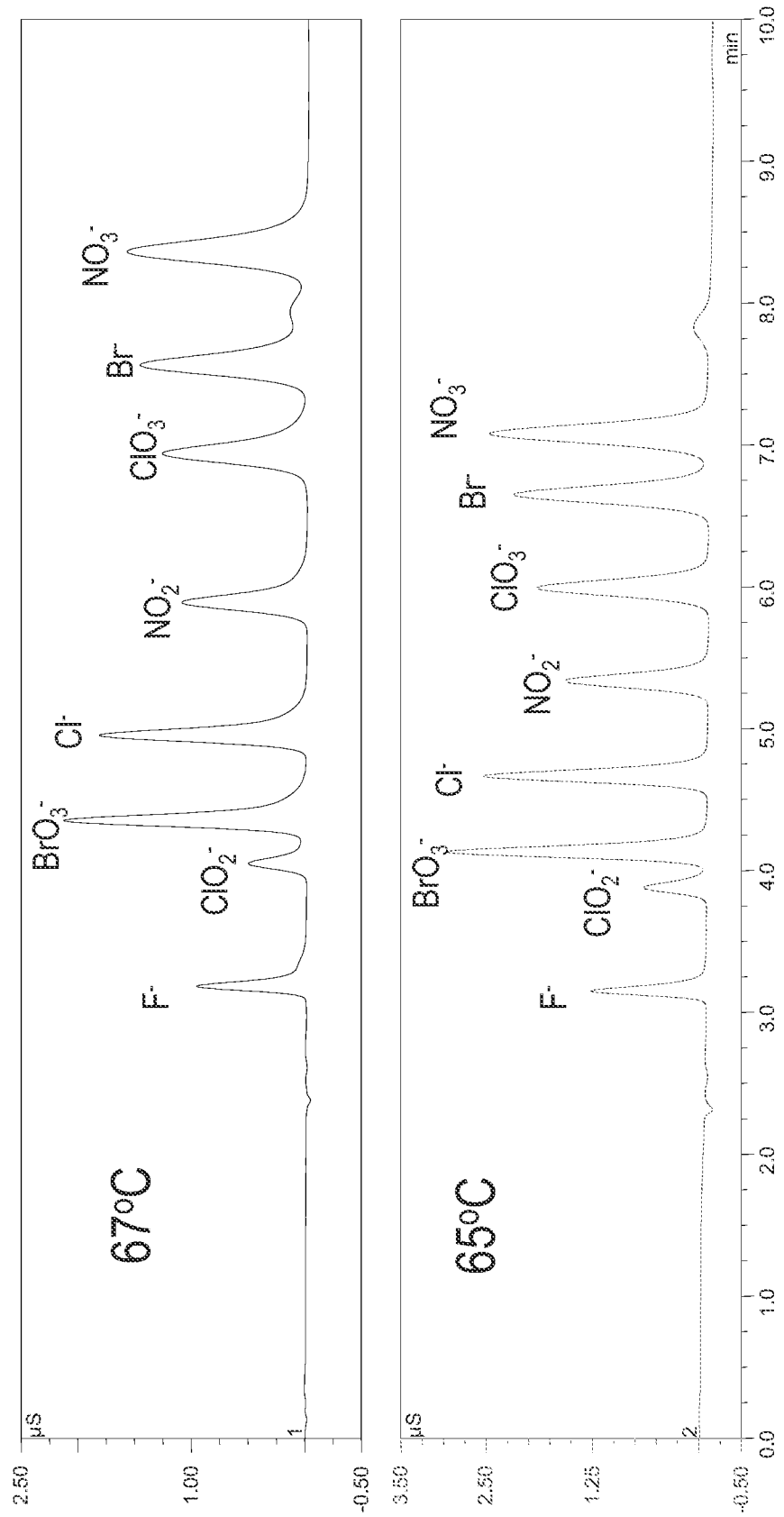
FIG. 28 is two chromatograms of an ion mixture on a column of the invention prepared from a synthesis with 0.5M 1,3-bis[dimethylamino)-2-propanol after 3.5 and 0.5 reaction, illustrating the effect of reaction temperature on selectivity. Note improved resolution of bromide and nitrate at elevated reaction temperature resolution of $SO_3^{2-}$ and $SO_4^{2-}$.
Figure 29:
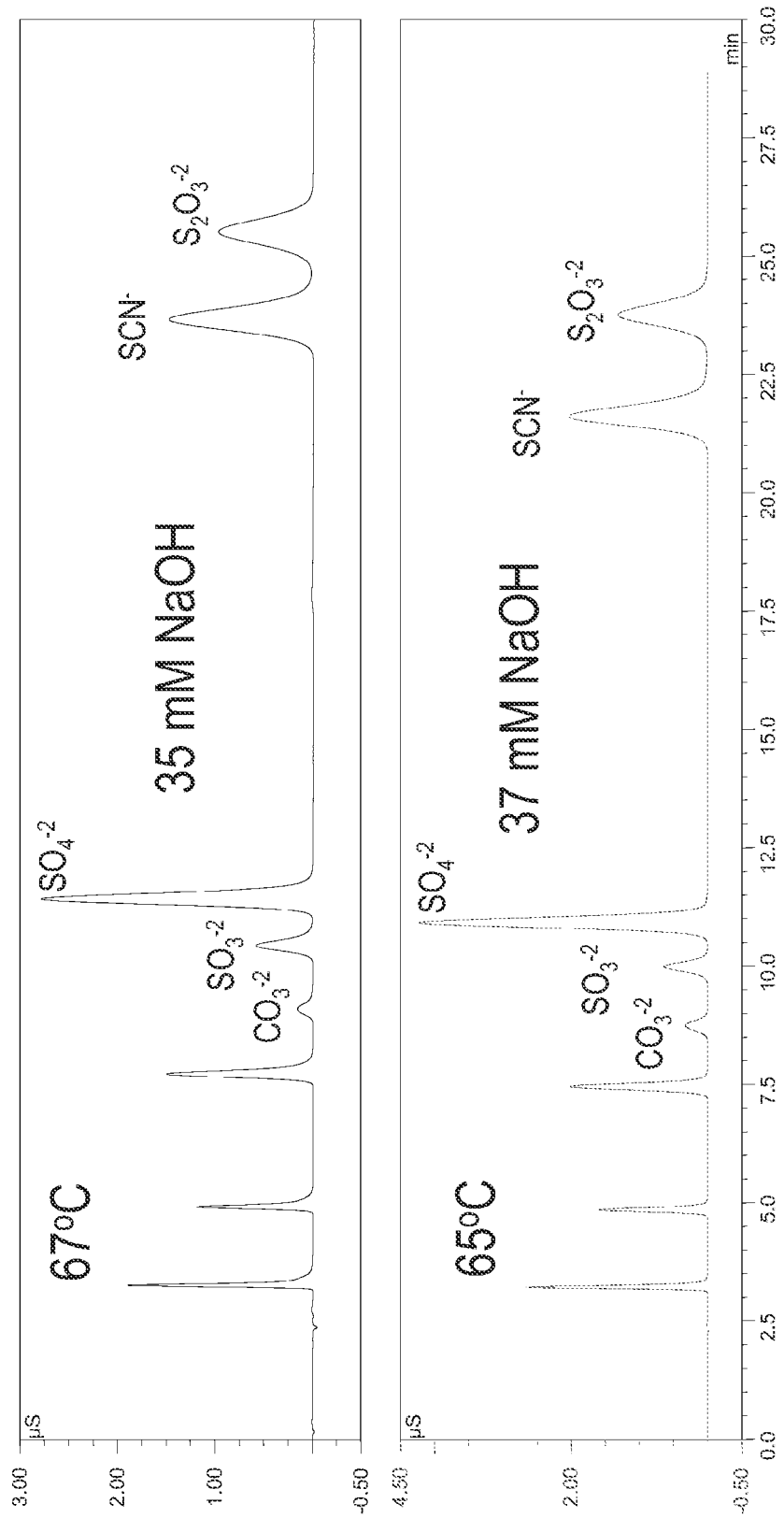
FIG. 29 is two chromatograms of an ion mixture on a column of the invention prepared from a synthesis with 0.5M 1,3-bis[dimethylamino)-2-propanol after 3.5 and 0.5 reaction cycles illustrating the effect of reaction temperature on selectivity. Note baseline resolution of $CO_3^{2-}$, $SO_3^{2-}$, $SO_4^{2-}$, $SCN^-$ and $S_2O_3^{-2-}$.

In various examples, the invention provides a method for making a substrate supported ion exchange medium. The method includes repeating the steps set forth above (e.g., (b) and (c)) a desired number of times until an ion exchange medium having the desired characteristics is produced. It will be apparent to those of skill in the art that when the steps are repeated, these repeated procedures can make use of the same polyfunctional compound as that used in the previous step, or one that is different. Moreover, the same polytertiary amine can be used as was used in the previous step, or a different one can be used. Thus, the method of the invention provides a great deal of flexibility in the design and production of substrate supported ion exchange media. FIG. 7 and FIG. 8.

In various embodiments, the reaction cycle of polyfunctional compound reacting with amine is repeated at least once, at least 2 times, at least 3 times, at least 4 times, at least 5 times, at least 6 times, at least 7 times, at least 8 times, at least 9 times or at least ten 10 times. As will be appreciated, when polyfunctional compound is reacted with tertiary amine, this reaction is referred to herein as a half-step (e.g., 3.5 reaction cycles). As defined herein, a reaction cycle that is repeated at least 3 times optionally includes the half step of 3.5 reaction cycles and the reactive functional groups on the surface of the polymer are derived predominantly from the polyfunctional compound, rather than the polytertiary amine. Thus, FIG. 7 shows the reaction product of a complete reaction cycle, and FIG. 8 shows the reaction product of a half cycle.

In an exemplary embodiment, the stoichiometry of a reaction cycle is controlled such that the resulting product includes unreacted amine-reactive functional groups or tertiary amines that can react with an incoming tertiary amine moiety, or amine-reactive moiety, respectively. As will be appreciated by those of skill in the art, the amount of a particular group (e.g., quaternary amine or amine-reactive functional group) can be effectively controlled by controlling the amount of a particular reagent added to the mixture used to prepare the condensation polymer.

In an exemplary embodiment, the polyfunctional compound is a di-functional compound and it is present in a reaction mixture at from about 5% to about 20%, e.g., from about 8% to about 15%, e.g., about 10% concentration. In various embodiments, the polytertiary amine is a di-tertiary amine and it is in 1M solution. In various embodiments, a solution of diepoxide as set forth above and a solution of ditertiary amine are combined in a reaction cycle.

In an exemplary embodiment, the polyfunctional compound is a diepoxide and it is present in a reaction mixture at from about 5% to about 20%, e.g., from about 8% to about 15%, e.g., about 10% concentration. In various embodiments, the polytertiary amine is a di-tertiary amine and it is in 1M solution. In various embodiments, a solution of diepoxide as set forth above and a solution of ditertiary amine are combined in a reaction cycle.

In an exemplary embodiment, the first condensation polymer layer includes reactive functional groups that are accessible to an incoming reactive tertiary amine monomer or polymer. The reactive tertiary amine monomer or polymer bears a tertiary amine moiety reactive with the amine-reactive functional group on the first polymer layer. The tertiary amine reacts with the functional groups becoming quaternized and attached to the first polymer layer. When the first monomer or polymer is attached to the first polymer layer, the resulting "second" layer can be further elaborated. In various embodiments, the layer attached to the first polymer layer is elaborated by the use of condensation polymerization.

In various embodiments making use of condensation polymerization to elaborate the first polymer or the layer attached to the first polymer layer, the elaboration is through a reagent bearing two or more tertiary amines and a nitrogen-reactive polyfunctional compound, each of which may itself be monomeric or polymeric.

In one example, the reactive tertiary amine-containing compound and the polyfunctional compound are combined with the substrate bearing the first polymer layer (or a "second" or higher order layer on the first polymer layer). The reaction proceeds under condensation polymerization conditions to provide at least a first layer of condensation polymer on the first polymer layer or the layer attached to the first polymer layer. For example, an amine with a reactive tertiary nitrogen atom and a diepoxide are combined with the substrate under condensation polymerization conditions and a condensation polymer layer is set down on the first polymer layer attached to the substrate.

In various embodiments, the substrate with the first quaternary amine containing polymer layer (i.e., the first layer above the basement layer) is contacted with the individual reactants in the condensation polymerization cycle. Thus, in one embodiment, the first polymer layer bears reactive tertiary amine functional groups. This reactive substrate is reacted with a polyfunctional compound reactive with the reactive amine functional groups under condensation polymerization conditions to form a condensation polymer. Similarly, the layer on the first polymer layer having a polyfunctional compound (or reactive functional groups derived from a polyfunctional compound) can be reacted with a reactive tertiary amine moiety under condensation polymerization conditions to form a layer of condensation polymer.

As used herein, the terms "reactive nitrogen" and "reactive amine" refer to a nitrogen atom possessing at least one open (excess valence allowing its reaction with a reactive functional group such as a group on a polyfunctional compound or a reactive functional group derived from a polyfunctional compound. Exemplary use of the terms are in connection with an incoming tertiary amine reactant, and a pendant tertiary amine on a condensation polymer layer, in a condensation polymerization reaction. After a tertiary amine has reacted with a reactive functional group of a polyfunctional compound to become a quaternary amine, the nitrogen atom is referred to as a "quaternary nitrogen" atom and is no longer considered a "reactive nitrogen".

When the amine includes more than one tertiary amine moiety, the amine has a linker between the two or more tertiary amines. Exemplary amines are those having linkers which are substituted or unsubstituted alkyl or substituted or unsubstituted heteroalkyl with from 1-20 carbon atoms, optionally interrupted by 1 to 12 heteroatoms or "alkyl group substituents" as this term is used herein. In an exemplary embodiment, the linker includes 1, 2, 3, 4, 5, 6, 7, 8, 9, 10, 11, 12, 13, 14, 15, 16, 17, 18, 19 or 20 atoms. In an exemplary embodiment, the linker is more than two carbons. In an exemplary embodiment, the linker is 3 or more atoms, 4 or more atoms, or 5 or more atoms.

The term "polyfunctional compound" refers to any compound having more than one reactive functional group, e.g., an amine-reactive functional group. Exemplary polyfunctional compounds include two or more reactive functional group linked through a substituted or unsubstituted alkyl or substituted or unsubstituted heteroalkyl linking moiety. Exemplary linking moieties include those with from 1-20 carbon atoms and optionally contain from 0-12 heteroatoms. Exemplary linking moieties include those having 1, 2, 3, 4, 5, 6, 7, 8, 9, 10, 11, 12 or more carbon atoms. Reactive functional groups on a polyfunctional compound are referred to herein as "polyfunctional compound reactive functional groups."

The terms "reactive functional group derived from a polyfunctional compound" and "pendant amine-reactive functional group" are used interchangeably and refer to reactive functional groups of a polyfunctional compound that has been through at least one condensation polymerization cycle; however, at least one reactive functional group derived from a polyfunctional compound is not reacted in this particular reaction cycle, and remains reactive. Thus, in the case of a diepoxide, if one of the epoxide groups remains unreacted after a reaction cycle with, for instance, an amine moiety, the unreacted epoxide is referred to as a "reactive functional group derived from a polyfunctional compound." Those of skill will appreciate that a similar discussion is applicable when the polyfunctional compound includes more than two reactive functional groups and or includes functional groups that are not epoxides. Thus, for example, the discussion is relevant to diamines, triamines, dicarboxylic acids, tricarboxylic acids, triepoxides, etc.

In various embodiments, the polytertiary amine is not a cross-linking agent. In exemplary embodiments, less than 1%, less than 5% or less than 10% of the bonds formed with the tertiary amine component are cross-links. In an exemplary embodiment, the condensation polymer is essentially water-insoluble, and is not a gel.

At each step in which a condensation polymer is formed one or more of a reactive tertiary amine group and a reactive functional group derived from a polyfunctional compound (e.g., an epoxide) is present in the condensation polymer. In various embodiments, these groups are present on the "exterior" or "surface" of the substrate. As used herein, the terms "exterior" and "surface" have their normal meanings and also include an operational definition: the groups are accessible to an incoming reactant such as an amine, a polyfunctional compound or other compound.

The polymer coating on the surface of the substrate (first layer) can be a hydrophilic or hydrophobic polymer. Suitable polymers for the organic polymer layer include, without limitation substituted or unsubstituted polymers or copolymers of polyalkylenes, polyesters, polyamines, polyamides, polyethers, polysulfonates, polyoxides, polyalkyleneglycols, polystyrenic based polymers, polyacetals, polychlorides, polysaccharides, polycarbonates, polymers of monoethylenically unsaturated monomers, polymers of polyvinylidene monomers and mixtures and copolymers of the above polymers. The hydrophobicity/hydrophilicity of the polymer is controlled by varying the number of tertiary amine groups on the polymer and by varying the content and composition of the linkers between two or more amine-reactive functional groups in the polyfunctional compound and in the polytertiary amine. Hydrophobicity and hydrophilicity can also be controlled by including functional groups that are polar or charged in the polyfunctional tertiary amine or the polyvalent compound.

In various embodiments, the first polymer layer is hydrophilic and has functional groups that are polar or charged, rendering the polymer soluble in, or capable of absorbing water. The polymers are chosen such that they allow for anchor sites via electrostatic bonding such as anionic carboxylate sites in polyacrylic acid or allow reactive sites (e.g., reactive functional groups) for reacting with amines, epoxides or other reactive species as the case may be. For example reactive sites bearing a halogen or other leaving group (e.g., chloride in vinyl benzyl chloride) can be reacted with amines, or carboxyl groups in polyacrylic acid can be reacted with epoxides and further modified per the present invention.

In various embodiments, the first polymer layer is formed from a monomer that includes a reactive or charged functional group other than the functional group through which the polymerization occurs (e.g., other than the epoxide). Reactive groups and classes of reactions useful in practicing the present invention are generally those that are well known in the art of bioconjugate chemistry. Currently favored classes of reactions available with reactive tubulysin analogues are those, which proceed under relatively mild conditions. These include, but are not limited to nucleophilic substitutions (e.g., reactions of amines and alcohols with acyl halides, active esters), electrophilic substitutions (e.g., enamine reactions) and additions to carbon-carbon and carbon-heteroatom multiple bonds (e.g., Michael reaction, Diels-Alder addition). These and other useful reactions are discussed in, for example, Smith and March, ADVANCED ORGANIC CHEMISTRY, 5th Ed., John Wiley & Sons, New York, 2001; Hermanson, BIOCONJUGATE TECHNIQUES, Academic Press, San Diego, 1996; and Feeney et al., MODIFICATION OF PROTEINS; Advances in Chemistry Series, Vol. 198, American Chemical Society, Washington, D.C., 1982.

In various embodiments, the first polymer or basement layer is formed by condensation polymerization of ammonia or a primary amine with a polyfunctional amine-reactive compound. An exemplary primary amine is methyl amine. An exemplary polyfunctional amine reactive compound is a di-epoxide. In an exemplary embodiment, the amine and the polyfunctional compound are combined in a ratio that forms a product having reactive amine groups on the polymer, which are available for reaction with an incoming polyfunctional amine-reactive compound.

A useful reactive functional group (also referred to as "a reactive functional moiety") on a polymerizable monomer, the first polymer layer, a condensation polymer, a polyfunctional compound or other component of the ion exchange medium of the invention or of use in a method to make this medium includes, but is not limited to:

(a) carboxyl groups and various derivatives thereof including, but not limited to, active esters, e.g., N-hydroxysuccinimide esters, N-hydroxybenzotriazole esters, thioesters, p-nitrophenyl esters, alkyl, alkenyl, alkynyl, aromatic esters, acid halides, and acyl imidazoles;

(b) hydroxyl groups, which can be converted to, e.g., esters, ethers, aldehydes, etc.

(c) haloalkyl groups, wherein the halide can be later displaced with a nucleophilic group such as, for example, an amine, a carboxylate anion, thiol anion, carbanion, or an alkoxide ion, thereby resulting in the covalent attachment of a new group at the functional group of the halogen atom;

(d) dienophile groups, which are capable of participating in Diels-Alder reactions such as, for example, maleimido groups;

(e) aldehyde or ketone groups, such that subsequent derivatization is possible via formation of carbonyl derivatives such as, for example, imines, hydrazones, semicarbazones or oximes, or via such mechanisms as Grignard addition or alkyllithium addition; sulfonyl halide groups for subsequent reaction with amines, for example, to form sulfonamides;

(g) thiol groups, which can be, for example, converted to disulfides or reacted with alkyl and acyl halides;

(h) amine or sulfhydryl groups, which can be, for example, acylated, alkylated or oxidized;

(i) alkenes, which can undergo, for example, cycloadditions, acylation, Michael addition, etc; and (j) epoxides, which can react with, for example, amines and hydroxyl compounds.

Exemplary functional groups of use in various embodiments include carboxylate, sulfonate, iminodiacetate, amine, halide hydroxyl, epoxide and a combination thereof.

The reactive and charged functional groups can be chosen such that they do not participate in, or interfere with, the reactions necessary to assemble the first polymer layer. Alternatively, a reactive or charged functional group can be protected from participating in the reaction by the presence of a protecting group. Those of skill in the art understand how to protect a particular functional group such that it does not interfere with a chosen set of reaction conditions. For examples of useful protecting groups, see, for example, Greene et al., PROTECTIVE GROUPS IN ORGANIC SYNTHESIS, John Wiley & Sons, New York, 1991.

"Protecting group," as used herein refers to a portion of a substrate that is substantially stable under a particular reaction condition, but which is cleaved from the substrate under a different reaction condition. A protecting group can also be selected such that it participates in the direct oxidation of the aromatic ring component of the compounds of the invention.

For examples of useful protecting groups, see, for example, Greene et al., PROTECTIVE GROUPS IN ORGANIC SYNTHESIS, 3rd ed., John Wiley & Sons, New York, 1999.

In various embodiments, the reactive functional group includes a leaving group. As used herein, the term "leaving group" refers to a portion of a substrate that is cleaved from the substrate in a reaction. The leaving group is an atom (or a group of atoms) that is displaced as stable species taking with it the bonding electrons. Typically the leaving group is an anion (e.g., Cl$^-$) or a neutral molecule (e.g., H$_2$O). Exemplary leaving groups include a halogen, OC(O)R', OP(O)R'R", OS(O)R' and OSO$_2$R'. R' and R" are members independently selected from substituted or unsubstituted alkyl, substituted or unsubstituted aryl, substituted or unsubstituted heteroaryl and substituted or unsubstituted heterocycloalkyl. Useful leaving groups include, but are not limited to, other halides, sulfonic esters, oxonium ions, alkyl perchlorates, sultanates, e.g., arylsulfonates, ammonioalkanesulfonate esters, and alkylfluorosulfonates, phosphates, carboxylic acid esters, carbonates, ethers, and fluorinated compounds (e.g., triflates, nonaflates, tresytates), SR', (R')$_3$P$^+$, (R')$_2$S$^+$, P(O)N(R')$_2$(R')$_2$, P(O)R'''R'R'''''R' in which each R' is independently selected from the members provided in this paragraph and R''' and R'''' are each either S or O. The choice of these and other leaving groups appropriate for a particular set of reaction conditions is within the abilities of those of skill in the art (see, for example, March J, ADVANCED ORGANIC CHEMISTRY, 2nd Edition, John Wiley and Sons, 1992; Sandler S R, Karo W, ORGANIC FUNCTIONAL GROUP PREPARATIONS, 2nd Edition, Academic Press, Inc., 1983; and Wade L G, COMPENDIUM OF ORGANIC SYNTHETIC METHODS, John Wiley and Sons, 1980).

As set forth herein, the term "reactive functional group" also includes components of the condensation polymer component(s) of the stationary phase of the invention, e.g., "pendant reactive functional groups." Thus, for example, after a first condensation polymerization reaction, there will generally be at least one amine or other reactive functional group in the resulting polymer that provides a locus for attachment of higher order condensation polymer layers, i.e., a second, third, fourth, fifth, sixth or higher layer. In an exemplary embodiment in which amine-epoxide chemistry is used to form a condensation polymer, the reactive functional group in the condensation polymer can be a reactive tertiary nitrogen of a polytertiary amine moiety or it can be an epoxide.

In various embodiments, the first polymer layer bears hydrophilic functional groups, for example, functional groups that were present on the polymerizable monomer precursor of the polymer. As used herein, the term hydrophilic functional groups include reactive and charged functional groups and such groups that are both reactive and charged. Exemplary hydrophilic functional groups include, without limitation, carboxylate, sultanate, phosphate, iminodiacetate, amine, halide, hydroxyl, and epoxide. As those of skill in the art appreciate, the first polymer layer can include hydrophilic functional groups of more than one structure. For example, a first polymer layer, which is a co-polymer, can have more than one type of hydrophilic functional group. In an exemplary embodiment, the first layer bears pendant hydroxy groups. In various embodiments, one or more of the first, second, third, fourth, fifth or sixth layers bears pendant hydroxyl groups.

In various exemplary embodiments, the first polymer layer is formed from a polymerizable monomer that includes at least one vinyl group. Exemplary polymers formed from such vinyl containing monomers include a polymer of acrylic acid, for example, poly(acrylic acid). In various exemplary embodiments, the first polymer layer comprises a polymer formed from a vinylbenzyl species, e.g., vinylbenzyl chloride.

In an exemplary embodiment, the first polymer layer is attached to the substrate surface. As used herein, the terms "attached" and "immobilized" are used interchangeably and encompasses interactions including, but not limited to, covalent bonding, ionic bonding, chemisorption, physisorption, electrostatic attraction and combinations thereof.

In certain embodiments, a percentage of the components of the first or higher polymer layer are cross-linked. Any crasslinking agent, useful to crosslink two or more components of the first polymer layer can be used in the present invention.

In various embodiments, the crosslinking agent is a polymerizable monomer. Preferred addition polymerizable crosslinking precursors include: ethylene glycol dimethacrylate (EGDMA); ethylene glycol diacrylate (EGDA); propylene glycol dimethacrylate; propylene glycol diacrylate; butylene glycol dimethacrylate; butylene glycol diacrylate; hexamethylene glycol dimethacrylate; hexamethylene glycol diacrylate; pentamethylene glycol diacrylate; pentamethylene glycol dimethacrylate; decamethylene glycol diacrylate; decamethylene glycol dimethacrylate; vinyl acrylate; divinyl benzene; glycerol triacrylate; trimethylolpropane triacrylate; pentaerythritol triacrylate; polyoxyethylated trimethylolpropane triacrylate and trimethacrylate and similar compounds as disclosed in U.S. Pat. Nos. 3,380,831; 2,2-di(p-hydroxyphenyl)-propane diacrylate; pentaerythritol tetraacrylate; 2,2-di-(p-hydroxyphenyl)-propane dimethacrylate; triethylene glycol diacrylate; polyoxyethyl-2,2-di-(p-hydroxyphenyl)-propane dimethacrylate; di-(3-methacryloxy-2-hydroxypropyl)ether of bisphenol-A; di-(2-methacryloxyethyl)ether of bisphenol-A; di-(3-acryloxy-2-hydroxypropyl)ether of bisphenol-A; di-(2-acryloxyethyl)ether of bisphenol-A; di-(3-methacryloxy-2-hydroxypropyl)ether of tetrachloro-bisphenol-A; di-(2-methacryloxyethyl)ether of tetrachloro-bisphenol-A; di-(3-methacryloxy-2-hydroxypropyl)ether of tetrabromo-bisphenol-A; di-(2-methacryloxyethyl)ether of tetrabromo-bisphenol-A; di-(3-methacryloxy-2-hydroxypropyl)ether of 1,4-butanedial; di-(3-methacryloxy-2-hydroxypropyl)ether of diphenolic acid; triethylene glycol dimethacrylate; polyoxypropyl-1-trimethylol propane triacrylate (462); 1,2,4-butanetriol trimethacrylate; 2,2,4-trimethyl-1,3-pentanediol dimethacrylate; pentaerythritol trimethacrylate; 1-phenyl ethylene-1,2-dimethacrylate; pentaerythritol tetramethacrylate; trimethylol propane trimethacrylate; 1,5-pentanediol dimethacrylate; diallyl fumarate; 1,4-benzenediol dimethacrylate; 1,4-diisopropenyl benzene; and 1,3,5-triisopropenyl benzene. A class of addition polymerizable crosslinking precursors are an alkylene or a polyalkylene glycol diacrylate or dimethacrylate prepared from an alkylene glycol of 2 to 15 carbons or a polyalkylene ether glycol of 1 to 10 ether linkages, and those disclosed in U.S. Pat. No. 2,927,022, e.g., those having a plurality of addition polymerizable ethylenic linkages, particularly when present as terminal linkages. Members of this class are those wherein at least one and preferably most of such linkages are conjugated with a double bonded carbon, including carbon double bonded to carbon and to such heteroatoms as nitrogen, oxygen and sulfur. Also included are such materials wherein the ethylenically unsaturated groups, especially the vinylidene groups, are conjugated with ester or amide structures and the like.

Following the attachment or formation and attachment of the first polymer layer to the substrate, a first condensation polymer reaction product is formed on and attached to the first polymer layer. The condensation polymer is a repeating organic chain, formed through the linkage of many smaller molecules in which chain growth occurs in a stepwise manner between monomers, at least one of which is generally a multifunctional monomer.

In various embodiments, the condensation polymer is built up in a step-wise manner on the surface of the substrate.

In exemplary embodiments, the first (or higher order condensation polymer layer is attached to the first polymer layer as an "intact polymer," by which is meant the condensation polymer is pre-formed prior to its attachment to the first polymer layer. The discussion herein regarding the formation of condensation polymers is germane to this embodiment both with respect to the method of making the intact polymer and exemplary intact polymers of use in the present invention. Higher order condensation polymer layers can be built out above the intact polymer layer.

In exemplary embodiments, the condensation polymer is formed by the reaction of at least two compounds, which can be contacted with the polymer coated substrate in essentially any useful order, amount or ratio of amounts. The concept of the formation of the condensation polymers is illustrated herein by reference to the reaction of an amine with polyfunctional compound. The invention is not limited to condensation polymers formed in this manner and these polymers can be formed using essentially any nucleophilic and electrophilic component. The present invention is further illustrated by reference to a polyfunctional electrophile, however, within the scope of the invention is the use of a polyfunctional nucleophile or electrophile.

As will be appreciated by those of skill in the art, the process for forming the condensation polymer set forth above can be repeated any desired number of times to build out successive layers of polymer. In various embodiments, the process is repeated 2, 3, 4, 5, 6, 7, 8, 9 or 10 or more times. Moreover, the order of the polymer component monomer addition, the identity of the component(s) and the ratio of the components can be different from one reaction cycle to the next. Thus, the present invention provides a highly versatile method of forming ion exchange media with a broad range of architecture and function.

In various embodiments according to the process set forth above, the reaction is performed to provide an excess of reactive tertiary amines from an amine compound or first polyfunctional compound in the first layer. By "unreacted" is meant that one or more of the amine moieties of the amine compound is unreacted or reactive functional groups of the polyfunctional compounds is unreacted (and therefore reactive). This can be accomplished adjusting by the molar ratio of reactants, the concentration of the reactants, the temperature of the reaction or the reaction time. In an exemplary embodiment, the first layer is formed from an approximately 1:1 ratio of primary amine (or ammonia) to diepoxide.

If a molar excess of the polyfunctional compound or reactive nitrogen compound is used to provide the unreacted moiety in excess in the polymer, the molar excess may vary over a wide range depending upon the characteristics to be imparted to the end product. Thus, for example, the excess expressed in terms of molar ratio of the reactants can be from as low as 0.2:1 to as high as 5:1 or more. More preferably the ratio is between 0.75:1 and 1:1.25. Some of the factors used to choose the excess amount is explained in more detail hereinafter.

In an exemplary embodiment, the first condensation polymer is attached to the first polymer layer. Each successive condensation polymer reaction product provides additional coverage for the substrate. Preferably, when the last of the series of condensation polymer layers is formed, the coating essentially covers the first polymer layer. The various polymer layers can be built out by in situ condensation polymerization or one or more can be attached to the first polymer layer as an intact, e.g., pre-formed, polymer. When an intact polymer is used, it will generally have a reactive functional group with reactivity complementary to the reactive functional group on the first polymer layer, allowing the attachment of these two layers.

In an exemplary embodiment, the condensation polymer is prepared through the reaction of polyfunctional amine and polyfunctional epoxide compounds. The composition is adjusted so that the mixture will not produce a gel under the conditions of its formation. For example, methylamine (a trifunctional amine capable of reacting with a total of three epoxy groups, forming a quaternary ion exchange site) is preferably combined with a water-soluble diepoxide (e.g., a difunctional epoxide), in a preferred embodiment 1,4-butanediol diglycidyl ether. If these two ingredients are combined in the ratio of 1 mole of methylamine to 1 mole of 1,4-butanediol diglycidyl ether, they tend to form a linear structure derivatized with available reactive functional groups (i.e., tertiary) rather than a gel.

In an exemplary embodiment, a condensation polymer is formed in the presence of an anionic substrate surface using an equimolar mixture of an amine reagent and a polyepoxide monomer. The amine reagent is chosen such that it can react with at least moles of epoxy reagent. An exemplary amine reagent is methyl amine and an exemplary polyepoxide monomer is butanediol diglycidyl ether. A mixture of the two reagents is allowed to react in the presence of the substrate until the substrate is suitably coated with a non-cross-linked condensation polymer. This reaction can be done in any suitable vessel or the reaction can be performed such that the media is in a column body with the reagents pumped through the column during the reaction. Ideally, the reaction mixture is washed away with a suitable rinse solvent prior to the next reaction step although this step is not a requirement. Water is an exemplary rinse solvent since chemical stability in water is superior to that of others solvents.

In an exemplary embodiment, the substrate, bearing reactive amine groups, is subsequently exposed to a polyepoxide monomer. The polyepoxide monomer can be the same as was used in the process above or it can be a different polyepoxide monomer. After the substrate is then allowed to react with the polyepoxide monomer, excess polyepoxide monomer is rinsed from the column with a suitable solvent although rinsing with solvent is not a requirement. Again, an exemplary polyepoxide monomer is butanediol diglycidyl ether and an exemplary rinse solvent is water.

The substrate is subsequently exposed to a suitable polytertiary amine. A wide variety of different polytertiary amines can be utilized. An exemplary polytertiary amine contains a propyl group linking the two tertiary amine sites in the molecule. In various embodiments, the polytertiary amine is 1,3-bis(dimethylamino)-2-propanol. Polymers based on this moiety display good chromatographic performance for thiocyanate. After the substrate has been allowed to react with the polytertiary amine for a suitable period of time, the substrate is rinsed with a suitable rinse solvent although a rinse solvent is not a requirement. Again, an exemplary rinse solvent is water.

The process described above is repeated as many times as necessary to achieve the desired selectivity and capacity.

In an exemplary embodiment, the substrate, already coated with the first polymer layer is subsequently allowed to react with a large excess (e.g., 50 to 200%) of polyfunctional epoxide, preferably butanediol diglycidyl ether in order to attach the reagent to the first polymer layer. By utilizing a large excess of polyfunctional epoxide, the first polymer layer is decorated with pendant unreacted epoxide groups. Following treatment with a large excess (e.g., 50 to 200%) of polyfunctional epoxide, the substrate is treated with a large excess of polytertiary amine, preferably 1,3-bis(dimethylamino)-2-propanol. This leaves the surface decorated with groups containing a pendant reactive tertiary amine functionality.

Repeating the cycle of using a large excess of polyfunctional epoxide followed by a large excess of polyfunctional amine results in attachment points at every amine with a quaternary site at the attachment points. Theoretically, making use of 1,4-butanediol diglycidyl ether and 1,3-bis(dimethylamino)-2-propanol and alternating reactions, results in an essentially linear condensation polymer with no additional branches with each layer. By utilizing this method, very high capacities are achieved by repeating the cycle a suitable number of times (e.g., at least 2, 3, 4, 5, 6, 7, 8 or more times).

In an exemplary embodiment, diepoxy monomer is used to produce the dianion selective materials. Hydroxide selectivity is increased by increasing the number of hydroxyl functional groups located near the quaternary center of each anion exchange site. Epoxy monomers provide such hydroxyl groups as a byproduct of the reaction of epoxides with amines. Accordingly, such condensation polymers are particularly useful for making hydroxide selectivity anion exchange phases. However, this does not limit the utility of the invention to epoxy monomers and amines. In fact, analogous condensation polymers can also be produced using for example polyfunctional alkylhalides in conjunction with polyfunctional amines. Such condensation polymers will not be hydroxide selective but will still be useful for preparation of anion exchange phases. In an exemplary embodiment, the method of the invention provides an essentially linear condensation polymer (attached to the first polymer layer) with at least one hydroxyl moiety derived from opening of the epoxide ring to form the quaternary amine center. In various embodiments, each quaternary amine has a hydroxyl moiety bound to the carbon adjacent to the carbon bearing the amine moiety, or at the carbon adjacent to that carbon. In an exemplary embodiment, at least 90%, at least 95% or at least 99% of the quaternary amine centers have a hydroxyl moiety bound to the carbon adjacent to the carbon bearing the amine moiety, or at the carbon adjacent to that carbon.

In various embodiments, referring to the reactants in step (c) and similar steps, the first amine compound comprises a tertiary amine with two or more tertiary amine moieties. The first amine compound can include additional amine groups and may include primary, secondary and/or tertiary amines.

The compounds used in the various steps may include a single polytertiary amine compound as the only amine compound, and a single polyfunctional compound as the only polyfunctional compound. Alternatively, an individual step can include mixtures of the first tertiary amine compound with one or more additional amine compounds and/or mixtures of the first polyfunctional compound with one or more additional polyfunctional compounds. In this way, each condensation polymer reaction product may be tailored to include the desired functions.

Further, the reactive nitrogen atoms in each amine compound and the two functional moieties in the polyfunctional compounds may be the same or different from each other. For example, the first amine compound may include at least only a primary amine group, only a secondary amine group, one or more primary and/or secondary groups, or the like. Similarly, the first polyfunctional compound may include the at least two functional moieties reactive with the amine groups which are of the same type or a different type, and may include, in addition, more than two functional moieties.

As set forth above a wide variety of alternative polyfunctional amines are also suitable for the present invention including simple diamines, triamines and higher polyamines. Propagation of polymer growth steps requires that the amine contain at least two available reactions sites. Termination of polymer growth can be accomplished by a final reaction step with tertiary amine containing compounds or the reaction can be ended without such a terminating reaction.

Suitable amine groups of use in the reaction cycles of the invention include without limitation, tetramethyldiaminopropane, tetramethyldiaminobutane, 1,3-bis(dimethylamino)-2-propanol and bis[2-(N,N-dimethylamino)ethyl]ether, tetramethylmethylenediamine, iminobisdimethylpropylamine. The size of the amine compounds may vary over a wide range from simple non-polymeric compounds, e.g., with molecular weights ranging from 17 to small polymeric compounds with molecular weights of 200 to 10,000. Moreover, amines of use in the invention can be polyfunctional, including more than one amine moiety. In various embodiments the poly-tertiary amine compound has at least three atoms in the link between each amine group in order to achieve good reactivity for each amine group. Polymeric species such as polyethyleneimine and polyamines derived from the hydrolysis of n-vinylformamide polymers are also useful in the present invention.

Exemplary polyfunctional compounds include at least two functional moieties reactive with the reactive nitrogen atom of the amine groups in the first or subsequent amine compound forming the first, second or higher numbered condensation polymer layers. Exemplary suitable functional moieties in the polyfunctional compounds include one or more of epoxides, alkyl halides, benzylhalides, tosylates, methylsulfides and mixtures thereof.

Exemplary epoxides of use in the present invention include butadiene diepoxide, ethyleneglycol diglycidyl ether, butanediol diglycidyl ether (e.g., 1,4-butanediol diglycidyl ether), diethyleneglycol diglycidyl ether, hexanediol diglycidyl ether, glycerol triglycidyl ether and numerous other compounds containing two or more epoxy groups including epoxy resins commonly used in commercial epoxy formulations. Suitable alkyl halides include dichloroethane, dichloropropane, dichlorobutane, dibromoethane, dibromopropane dibromobutane as well as numerous other alkyl halides. Suitable benzylhalides include alpha,alpha-dichloroxylene and alpha,alpha-dibromoxylene as well as numerous other benzylic halides. Suitable tosylates include ethyleneglycolditosylate, diethyleneglycolditosylate as well as tosylates of various other aliphatic or aromatic polyols. Suitable methylsulfides include 1,3-bis(methylthio)propane and 1,4-bis(methylthio)butane as well as numerous other polymethylsulfides. The polyfunctional compounds for the present invention preferably include epoxide polyfunctional moieties defined to include monoepoxide compounds, diepoxide compounds and/or polyepoxide moieties in compounds including polymers. The linker arms set forth in this non-limiting description are of general applicability with respect to polyfunctional compounds other than epoxides, e.g., those including one or more reactive functional group set (e.g., alkyl halides, benzylhalides, tosylates, methylsulfides).

In general terms, epoxides and amines react as set forth in U.S. Pat. No. 7,291,395, which is incorporated herein by reference in its entirety. Reactions between epoxides and ammonia, primary amines and secondary amines produce a reaction product which is directly suitable for subsequent reactions since the reaction product is in the free base form. Depending on the reaction conditions, other polyfunctional compounds such as alkyl halides produce reaction products which are in the salt form, necessitating a separate step or additional reagents to convert the reaction product back to the free base form.

In the case of tertiary amines, the reaction product is a quaternary amine ion, and the quaternized nitrogen of the product is not considered to be a reactive nitrogen atom. Unlike the previous example, this reaction also requires one mole of water. The counterion formed spontaneously as a byproduct of this reaction is hydroxide anion. This byproduct is advantageous in that it helps maintain an alkaline reaction medium which is beneficial for subsequent reaction of adjacent amine groups with additional polyfunctional compounds.

In an exemplary embodiment, in which the diepoxide is used in large excess relative to the amine concentration, the simplest conceivable reaction product is a quaternary amine compound functionalized with the amine-reactive functional groups derived from the polyfunctional compound. As in the previous example, the quaternary ion exchange site has a hydroxide counterion as a reaction byproduct.

In various embodiments, the condensation polymer is formed by reaction of a diepoxide and a tertiary amine in a 1:1 ratio (diepoxide:amine). Although a number of side groups and branch points are possible reaction byproducts, the predominant product of such a reaction is a linear polymer where each segment contains a quaternary amine group along with a hydrophilic linker. The degree of polymerization is dependent upon reaction conditions but the number of such repeating units (n) in the polymer thus formed can vary from as low as two or three to as high as several hundred. Ideally, high degrees of polymerization will be achieved in order at to provide good coverage of the entire surface and strong adhesion to the surface.

The size of the polyfunctional compounds may vary over a wide range from simple non-polymeric compounds, e.g., with molecular weights less than 87 to small polymeric compounds with molecular weights of 234 to 10,000. Exemplary polyfunctional compounds are water soluble and consist of glycidyl ethers of polyols or contain glycidyl ethers attached to hydrophilic polymers such as polyethyleneglycol or polypropyleneglycol or are combinations of all three such as glycerol propoxylate triglycidyl ether. More preferably the molecular weight range for the polyfunctional compound is between 200 and 500.

Other polyfunctional reagents capable of forming condensation polymers with either polyfunctional amines or polyfunctional epoxides may also be used in conjunction with or in the place of materials suitable for reacting with amines or materials suitable for reacting with epoxides. Suitable alternative polyfunctional reagents for reacting with polyfunctional amines include 2-methyl-2-nitro-L3-propanediol, dithiobis(succinimidyl propionate), cyanuric chloride, and polyfunctional acid chlorides such as dimethyl adipimidate dihydrochloride. Suitable alternative polyfunctional reagents for reacting with polyfunctional epoxides include compounds such as polyfunctional thiols. Preferably suitable reagents are also water-soluble in order to facilitate water-based synthesis methods.

In various embodiments, successive condensation polymer layers are formed after step (g) by repeating that or an earlier step, optionally alternating the excess of amine compound or polyfunctional compound so that in each successive layer the opposite of these two compounds is reacted with the reactive moiety in the prior layer to form an additional condensation polymer layer. As discussed above, this process can be repeated as many times as desired to achieve desired properties in the end product, typically in the form of a complete coating on the substrate.

At any time in the processes set forth herein using amine and epoxide chemistry, the condensation polymer reaction product has the cationic functionality of the quaternary amine groups. The cationic amine product may be used directly in this form without further modification. In this case, the product of this reaction will contain both strong anion exchange sites and weak anion exchange sites which can be advantageous for some separations. In another preferred embodiment, strong anion exchange sites may be introduced into the outside layer of the condensation polymer through a capping reaction by reacting with a capping compound comprising a tertiary (or quaternary) amine group. In this manner, the reaction is capped or terminated and the ion exchange coating includes a greatly increased number of quaternary amines conventionally used for the separation of anions.

In one embodiment, one or more of the condensation polymer functional groups is branched and/or cross-linked. For example, the second, third or higher condensation polymer layer can be branched and cross-linked by appropriate choice of reagents and by choice of reagents and by adjustment of the ratios of reagents and excesses of one or the other of the amine compounds and polyfunctional compounds as set forth hereinafter.

Formation of a gel in a resin slurry mode or a flow-through "packed column" mode may be undesirable in that in the former case gelation would result in resin particles suspended in a stable gel unsuitable for use in liquid chromatography and in the latter case would result in the development of extremely high pressures, precluding the use of pumping as a means of delivering the reagent, rendering the material unsuitable for use in liquid chromatography. If instead, the ratio of the reagents is adjusted so that a gel does not form (preferably using a composition close to that capable of gelation without using a composition capable of gelation), the solution can be passed through the "packed column" without experiencing a high-pressure characteristic of gelation. Furthermore, the coating thickness will continue to increase as this solution is passed through the column.

Conditions leading to gel formation are generally to be avoided, especially in the case of slurry grafting, useful synthesis methods include use of combinations which ultimately lead to gel formation by simply reducing exposure time of the resin to the reaction mixture such that the exposure time is less than the gelation time of the reaction mixture. In one useful embodiment of the current invention, passing such a solution through a packed bed of resin not only results in a graft to the resin surface but also in attachment of the individual particles in the packed column to form a particle based monolith. By choosing appropriate conditions, the resulting monolith can be removed from the column body within which it was formed. Because polymers generally contract as polymerization proceeds, the column contents shrink away from the column wall allowing removal of the monolith from the column hardware. The resulting monolith is generally flexible when well hydrated. By allowing the monolith to dry and reinserting it into suitable dimension column hardware, the resulting monolith can be utilized for chromatographic separations.

While the exact conditions may vary in terms of concentration, temperature and time required for a given mixture of polyfunctional epoxy monomer and polyfunctional amine to result in gel formation, there is a simple empirical experimental methodology suitable for determination of conditions optimal for preparation of the condensation polymer in order to promote or prevent gel formation during this step. First, start with a 1:1 mole stoichiometry and produce a solution of the two reagents in the proposed reaction solvent. The reagents react for the proposed reaction duration at the proposed temperature and the presence or absence of gel formation is noted. If gel formation is observed, the quantity of epoxy monomer is decreased and the process repeated until the boundary between gel forming conditions and non-gel forming conditions is established. Alternatively, if no gel formation is observed, the amount of epoxy monomer is increased in the formulation until gel formation is observed.

Also, according to the invention, a large quantity of particles may be packed in a bed and coated in a large flow-through column and removed in large quantities as a supply for packed smaller analytical columns.

In various embodiments, one or more of steps (a), (b), (c), (d), (e), (f) and/or (g) (and/or further iterations) are performed in a flowthrough chamber. In these embodiments one or more of the reactive components is flowed through the chamber. When more than one reactive component is flowed through the chamber, they are flowed either together or sequentially.

An advantage of various embodiments of the current invention is that when the condensation polymer is applied to a column packed with substrate, the coating process can be interrupted for column evaluation, and then the process can be resumed. However, because epoxides are subject to hydrolysis under alkaline conditions, it is generally preferable to interrupt the reaction after reaction with a polyfunctional amine containing reagent rather than immediately after reaction with a polyfunctional epoxy containing reagent. Likewise, although the preferred polyfunctional epoxide is butanediol diglycidyl ether a wide variety of polyfunctional epoxides may be used in the present invention. Ideally the polyfunctional epoxide should be water-soluble to facilitate formation of the condensation polymer under aqueous conditions but any of the numerous polyfunctional epoxides available can be used for this purpose. Furthermore, a wide variety polyglycidyl reagents not readily available can be readily synthesized using standard synthesis methods.

While in situ column preparation of condensation polymers is a convenient way of quickly evaluating different formulations, in-situ column preparation is generally not as efficient as batch synthesis. However, by making use of either slurry grafting techniques or preferably large packed bed reactors, optimal coating chemistries can easily be transferred to larger scale batch processes.

Suitable substrates include, but are not limited to, a variety of commercially available chromatographic media such as packed beds of chromatography particles, and also include many other formats including tubing which has been suitably derivatized and fused silica capillaries which can be used after a simple base hydrolysis treatment to activate the surface. Thus, the term "substrate" encompasses one or more substrates unless otherwise specified. Furthermore, products based on planar materials such as "chips" and arrays commonly employed in biological assays may also be employed as substrates. In the latter case, the surfaces may be modified by application of multiple layers as described above or one or more layers of gel forming reagent mixtures may be applied to the surface to form binding sites for biological molecules.

In various embodiments, the substrate is in the form of particles. Also of use are various forms of flow-through monolithic media and flow-through hollow tubes in which one or more walls serve as the substrate.

In one embodiment, the substrate has a surface comprising an organic polymer. This organic polymer surface is distinct from the condensation polymer discussed herein. The term "surface" encompasses both the surface of a substrate which is of the same chemical makeup as the remainder of the substrate, and a surface with a surface layer on a support substrate of a different chemical makeup. Thus, the organic polymer surface may comprise the entire substrate or just the top surface of the substrate which may be formed of another material such as one made of an inorganic oxide. Alternatively, the substrate may comprise in inorganic material on its surface, such as one made of an inorganic glass or oxide, e.g., silica gel, alumina, titania, zirconia, and fused silica.

In various embodiments, the substrate is a styrenic substrate. In these embodiments, a first polymer layer can be attached to the substrate through reaction of styryl residues on the substrate surface with an incoming monomeric precursor of the first polymer layer. In an exemplary embodiment, the first polymer layer attached to the substrate is based on a vinyl monomer. In various embodiments, the vinyl monomer is an acryloyl monomer, such as acrylic acid. Thus, in exemplary embodiments, the invention provides an ion exchange medium having a styrenic substrate to which a first polymer layer comprising acrylic acid is attached.

In various embodiments of the invention, the substrate includes a reactive functional group or anionic or cationic functional moieties on its surface.

In another exemplary embodiment the invention provides an aggregated chromatographic material incorporating the ion exchange material set forth herein. Thus, the ion exchange medium of the invention is contacted with a second ion exchange medium having an opposite charge under conditions promoting the electrostatic aggregation of the two ion exchange materials, thereby forming an electrostatically aggregated on exchange medium. In various embodiments, the coated ion exchange material of the invention is negatively charged and the second ion exchange medium is positively charged. In another exemplary embodiment, the coated ion exchange material of the invention is positively charged and the second ion exchange medium is negatively charged. Such aggregated media are described in, for example, Small, et al. U.S. Pat. No. 4,101,460 in which is described finely divided insoluble materials are bound by electrostatic attraction to substrate particles having ion exchange sites.

In various embodiments, the aggregate is submitted to one or more rounds of condensation polymer formation conditions as set forth herein. Thus, an exemplary aggregate is submitted to a mixture of an amine containing a reactive nitrogen atom, and a polyfunctional compound. The product of this treatment can be submitted to additional rounds of condensation polymerization, another aggregation step or a combination thereof. Exemplary condensation polymerization chemistry of use in this embodiment includes the reaction of an amine with a polyfunctional (e.g., diepoxide).

In various exemplary embodiments, the invention provides a stationary phase having attached thereto one or more condensation polymer layer formed by the reaction of a polytertiary amine with a diepoxide. In an exemplary embodiment, the amine is an alkyl polytertiary amine. In an exemplary embodiment the diepoxide is an alkyl diepoxide. In these alkyl compounds the tertiary amine or epoxide groups are linked via a substituted or unsubstituted alkyl moiety having 1, 2, 3, 4, 5, 6, 7, 8, 9, 10 or more carbon atoms in the chain. An exemplary aliphatic diepoxide is 1,4-butanediol diglycidyl ether. In another exemplary embodiment, this stationary phase has at least 1, 2, 3, 4, 5, 6 or more additional layers of condensation polymer layered above the first condensation polymer layer. In various embodiments, each successive layer of condensation polymer is attached to the layer below it. In an exemplary embodiment, at least 1, 2, 3, 4, 5, 6 or more of these condensation polymer layers are formed by the reaction of a polytertiary amine with a diepoxide. In exemplary embodiments, at least 1, 2, 3, 4, 5, 6 or more of these layers are formed by condensation polymerization of the same polytertiary amine, the same diepoxide or a combination thereof. In certain embodiments, one or more successive layer is formed using polytertiary amine or a polyepoxide different from that used to form the previous layer. In various embodiments, the polytertiary amine is a ditertiary amine. In certain embodiments, a condensation polymer layer is used to form an electrostatically attached aggregate with particles of a charge opposite that of the condensation polymer layer. In still further exemplary embodiments, the aggregate is exposed to condensation polymerization conditions including a primary amine and a diepoxide as set forth herein.

Exemplary amines of use in the present invention include without limitation tetramethyldiaminopropane, tetramethyldiaminobutane, 1,3-bis(dimethylamino)-2-propanol and bis[2-(N,N-dimethylamino)ethyl]ether, tetramethylmethylenediamine, iminobisdimethylpropylamine. Other useful polyamines are readily available to those of skill in the art.

In an exemplary embodiment, the stationary phase of the invention is formed by successive condensation polymerization of butanediol diglycidyl ether and tetramethyldiaminopropane. In various embodiments, the stationary phase is formed by successive condensation polymerization of butanediol diglycidyl ether and tetramethyldiaminobutane. In various embodiments, the stationary phase is formed by successive condensation polymerization of butanediol diglycidyl ether and 1,3-bis(dimethylamino)-2-propanol. In an exemplary embodiment, the stationary phase is formed by successive condensation polymerization of butanediol diglycidyl ether and bis[2-(N,N-dimethylamino)ethyl]ether. In an exemplary embodiment, the stationary phase of the invention is formed by successive condensation polymerization of butanedial diglycidyl ether and tetramethylmethylenediamine. In various embodiments, the stationary phase is formed by successive condensation polymerization of butanediol diglycidyl ether and iminobisdimethylpropylamine.

In exemplary embodiments according to the above-recited stationary phases, the successive condensation polymerizations are performed, at least 2, 2.5, 3. 3.5. 4. 4.5. 5. 5.5, 6 or at least 6.5 times.

In an exemplary embodiment, the first layer is formed by reaction of a primary amine or ammonia with a diepoxide such as butanediol diglycidyl ether with a stoichiometry such that the polymer includes amine reactive epoxides. The successive layers are built up as described herein.

In various embodiments, the stationary phase of the invention is formed by condensation polymerization of a polytertiary amine and a diepoxide and provides complete baseline separation of sulfate and sulfite ion under ion chromatographic conditions. In various embodiments, the stationary phase of the invention is formed by condensation polymerization of a polytertiary amine and a diepoxide and provides complete baseline separation of sulfate, sulfite and thiocyanate ions under ion chromatographic conditions. In various embodiments, the stationary phase of the invention is formed by condensation polymerization of a polytertiary amine and a diepoxide and provides complete baseline separation of sulfate, sulfite and carbonate ions under ion chromatographic conditions. In various embodiments, the stationary phase of the invention is formed by condensation polymerization of a polytertiary amine and a diepoxide and provides complete baseline separation of sulfate, sulfite and thiosulfate ions under ion chromatographic conditions. In various embodiments, the stationary phase of the invention is formed by condensation polymerization of a polytertiary amine and a diepoxide and provides complete baseline separation of sulfate, sulfite, carbonate and thiosulfate ions under ion chromatographic conditions. In various embodiments, the stationary phase of the invention is formed by condensation polymerization of a polytertiary amine and a diepoxide and provides complete baseline separation of sulfate, sulfite, carbonate, thiocyanate and thiosulfate ions under ion chromatographic conditions.

Exemplary ion chromatographic conditions include use of a 4 mm internal diameter column, 1 mm/min eluent flow rate and from about 10 to about 60, e.g., from about 20 to about 45 mM KOH as an eluent. Column temperature may vary from about 15° C. to about 90° C., for example from about 20° C. to about 60° C., e.g., from about 30° C. to about 40° C. An exemplary run condition for determining whether the stationary phase of the invention achieves complete baseline separation of any two or more of sulfate, sulfite, carbonate, thiocyanate and thiosulfate is use of a 4 mm internal diameter column, 1 mL/min eluent flow rate, 40 mM KOH and a column temperature between about 30 and 35° C.

In an exemplary embodiment, the stationary phase of the invention, when utilized for ion chromatography under the above-recited conditions will provide an adjusted relative retention value of at least about 0.1. FIG. 30.

As will be apparent to those of skill in the art, the various elements of the exemplary embodiments set forth above can be combined in various manners to produce stationary phases that are within the purview of the instant invention.

In order to further illustrate the present invention, the following non-limiting examples of its practice are provided.

Example 1

A surface sulfonated substrate composed of a divinylbenzene-ethylvinylbenzene co-polymer with an average particle size of 6 microns and surface area of 18 $m^2$/gram is packed into a 4 mm column after which the initial ground layer is prepared at 65° C. by passing an equimolar mixture of butanediol diglycidyl ether and methyl amine (both approximately 0.39 molar) over the substrate for 10 minutes. The reaction mixture is then allowed to react in the column for 60 minutes (step one). The reaction mixture is then rinsed from the column with deionized water for five minutes. Following this, a 10% solution of butanediol diglycidyl ether in water is passed over the column for 10 minutes and then allowed to react for 20 minutes while at 65° C. (step two). The reaction mixture is then rinsed from the column with deionized water for five minutes. Following this, a one molar solution of 1,3-Bis(dimethylamino)-2-propanol is passed over the column for 10 minutes and then allowed to react for 20 minutes while at 65° C. (step three). Following this step two is repeated, followed by another rinse step, followed by step three, followed by another rinse step, followed by step two, followed by another rinse step, followed by step three, followed by another rinse step, followed by step two, followed by another rinse step, followed by passing a 1.4 molar solution of methyl amine over the column for 10 minutes and then allowing for a solution to react for 20 minutes while at 65° C. After rinsing the column with additional deionized water and then conditioning the column with potassium hydroxide, the column is now suitable for use.

Example 2

Columns were tested on a DX500 ion chromatography system consisting of a GP40 gradient pump, an AS50 autosampler with TC column compartment, an ED50 conductivity/electrochemical detector, an EG40 eluent generator containing an EGC-II KOH cartridge and CR-ATC. The system utilized Chromeleon 6.8 software for collection and analysis of data. Also the concentration of the mobile phase was varied, in general the operating conditions were 40 mM potassium hydroxide at 1 mL per minute and 30° C. A 5 µL injection volume was used. Sample concentrations were in the 1-10 ppm range.

Example 3

A surface sulfonated substrate composed of a divinylbenzene ethylvinylbenzene co-polymer with an average particle size of 6 microns and surface area of 18 m2/gram is packed into a 4 mm column after which the initial ground layer is prepared at 74° C. by passing an equimolar mixture of butanediol diglycidyl ether and methyl amine (both approximately 0.39 molar) over the substrate for 10 minutes. The reaction mixture is then allowed to react in the column for 60 minutes (step one). The reaction mixture is then rinsed from the column with deionized water for five minutes. Following this, a 10% solution of butanediol diglycidyl ether in water is passed over the column for 10 minutes and then allowed to react for 20 minutes while at 74° C. (step two). The reaction mixture is then rinsed from the column with deionized water for five minutes. Following this, a 1.29 molar solution of dimethyl amine is passed over the column for 10 minutes and then allowed to react for 20 minutes while at 74° C. (step three). Following this step two is repeated, followed by another rinse step, followed by step three, followed by another rinse step, followed by step two, followed by another rinse step, followed by step three, followed by another rinse step, followed by step two, followed by another rinse step, followed by step three, followed by another rinse step. After rinsing the column with additional deionized water and then conditioning the column with potassium hydroxide, the column is now suitable for use.

Example 4

Suitable A surface sulfonated substrate composed of a divinylbenzene-ethylvinylbenzene copolymer with an average particle size of 6 microns and surface area of 18 m2/gram is packed into a 4 nm column after which the initial ground layer is prepared at 73° C. by passing an equimolar mixture of butanediol diglycidyl ether and methyl amine (both approximately 0.39 molar) over the substrate for 10 minutes. The reaction mixture is then allowed to react in the column for 60 minutes (step one). The reaction mixture is then rinsed from the column with deionized water for five minutes. Following this, a 10% solution of butanediol diglycidyl ether in water is passed over the column for 10 minutes and then allowed to react for 20 minutes while at 73° C. (step two). The reaction mixture is then rinsed from the column with deionized water for five minutes. Following this, a 11.29 molar solution of tetramethylmethylenediamine is passed over the column for 10 minutes and then allowed to react for 20 minutes while at 73° C., (step three). Following this step two is repeated, followed by another rinse step, followed by step three, followed by another rinse step, followed by step two, followed by another rinse step, followed by step three, followed by another rinse step, followed by step two, followed by another rinse step, followed by step three, followed by another rinse step. After rinsing the column with additional deionized water and then conditioning the column with potassium hydroxide, the column is now suitable for use.

Example 5

This example shows the synthesis of a carboxylate surface modification of chromatographic substrate. Media composed of a divinylbenzene-ethylvinylbenzene co-polymer with an average particle size of 6.5 microns and surface area of 22 m$^2$/gram was used as the substrate to prepare a substrate with an anionic polymeric surface according to the present invention. The process is as follows: 100 g of the substrate resin packing material was first dispersed in 50% iso-propanol (IPA) in deionized (DI) water solution and mixed well. The resin was then rinsed twice with DI water and then filtered to a moist cake. The moist cake was dispersed in 200 g of DI water and then acrylic acid (A) and initiator (B) was added. Solution (A) comprised 10% to 20% monomer by weight added to 200 gm of DI water followed by the addition of 100 g of IPA. The resin was mixed well. B) comprised of 6 g of initiator (Azobiscyanovaleric acid) which was added to a mixture of 30 g of DI water and 20 g of 50% NaOH. The mixture was sonicated before adding this to the resin monomer mixture. The synthesis reaction proceeded with stirring at 72° C. for 5 hours. The resin was filtered and washed with hot DI water and filtered, followed by an acetone soak and a wash with acetone. The resin was washed one more time with DI water and filtered to obtain a resin with the desired carboxylated surface.

Example 6

The resin from Example 5 was next reacted as described below. The resin was first packed into a 4×250 mm column by making a slurry in DI water and then packing this using DI water at a packing pressure of 4000 psi for 10 minutes. Next a chromatographic pump with a gradient proportioning valve was used for the condensation polymer synthesis. The proportioning valve was connected to the four reagents as listed below E1: 10% 1,4-Butanediol diglycidyl ether (BDDGE) in water
E2: 4% Methyl amine in water
E3: 1.0 M 1,3 Bis(dimethylamino)-2-propanol
E4: DI water The solutions were pumped into the above (4×250 mm) column using a flow rate of 0.5 ml/min. The column was placed in a water bath at 65 C.

| % E1 | E2 % | % E3 | % E4 | Time |
|---|---|---|---|---|
| 72 | 28 | 0 | 0 | 10 min. @ 0.5 mL/min, 60 min. at 0 mL/min |
| 100 | 0 | 0 | 0 | 10 min. @ 0.5 mL/min, 20 min. at 0 mL/min |
| 0 | 0 | 50 | 50 | 10 min. @ 0.5 mL/min, 20 min. at 0 mL/min |
| 100 | 0 | 0 | 0 | 10 min. @ 0.5 mL/min, 20 min. at 0 mL/min |
| 0 | 0 | 50 | 50 | 10 min. @ 0.5 mL/min, 20 min. at 0 mL/min |
| 100 | 0 | 0 | 0 | 10 min. @ 0.5 mL/min, 20 min. at 0 mL/min |
| 0 | 0 | 50 | 50 | 10 min. @ 0.5 mL/min, 20 min. at 0 mL/min |
| 100 | 0 | 0 | 0 | 10 min. @ 0.5 mL/min, 20 min. at 0 mL/min |
| 0 | 100 | 0 | 0 | 10 min. @ 0.5 mL/min, 20 min. at 0 mL/min |
| 0 | 0 | 0 | 100 | 10 min. @ 0.5 mL/min, 20 min. at 0 mL/min |

The column could be tested directly or more preferably the column could be unpacked and then the phase repacked into smaller dimensions suitable for chromatography.

Example 7

The 4×250 mm column from Example 6 was used for analysis of common anions using a DX 500 Ion Chromatograph System (from Dionex Corporation, Sunnyvale, Calif.). The operational conditions are as follows: 37 mM KOH was used as the eluent at a flow rate of 1 mL/min. A sample comprising 6 anion standards with the concentrations listed below were used. The injection volume was 25 μL. The retention time obtained for the various analytes demonstrates the utility of the phase from Example 6 for chromatographic separations.

| Peak Name | Concentration (mg/L) | Retention Time (Minutes) |
|---|---|---|
| Fluoride | 0.5 | 4.307 |
| Nitrite | 1.0 | 7.550 |
| Chloride | 1.0 | 8.870 |
| Bromide | 3.0 | 11.684 |
| Nitrate | 3.0 | 12.34 |
| Cabonate | — | 17.22 |
| Sulfate | 3.0 | 21.45 |

Although the invention has been described in terms of specific embodiments and applications, persons skilled in the art can, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof. All patent and literature references are incorporated herein by reference in their entirety for all purposes.

What is claimed is:

1. An ion exchange stationary phase formed by a method comprising:
    (a) reacting at least a first polyfunctional compound comprising two or more amine-reactive functional groups with a primary amine, forming a first polymer layer with a population of reactive tertiary amines;
    (b) reacting at least a portion of said population of reactive tertiary amines with a polyfunctional compound comprising two or more amine-reactive functional groups, forming a second polymer layer with pendant amine-reactive functional groups, and a population of quaternary amines; and
    (c) reacting said second polymer layer with an amine which is a member selected from tetramethylethylenediamine, tetramethyldiaminopropane, tetramethyldiaminobutane, iminobisdimethylpropylamine, and 1,3-bis(dimethylamino)-2-propanol.

2. The ion exchange stationary phase of claim 1 in which at least one layer of said condensation polymer includes a functional group which is cross-linked.

3. The ion exchange stationary phase of claim 1 in which at least one layer of said condensation polymer includes a functional group which includes branched polymer chains.

4. The ion exchange stationary phase of claim 1 in which steps (a) and (b) are performed in a flowthrough chamber by sequentially flowing said first and second amine compounds and first or second polyfunctional compounds past said substrate.

5. The ion exchange stationary phase of claim 1 in which step (a) is performed on a plurality of said substrates in the form of particles and said coated substrates comprise ion exchange packing particles.

6. The ion exchange stationary phase of claim 3 in which step (a) is performed on a plurality of said substrates in the form of particles and wherein said coated substrates comprise ion exchange packing particles, said coated particles are removed from said chamber in a form suitable for use as chromatographic packing.

7. The ion exchange stationary phase of claim 1 in which said substrate comprises a flow-through monolithic medium.

8. The ion exchange stationary phase of claim 1 in which said substrate comprises a wall of a flow-through hollow tube.

9. A coated substrate coated with an ion exchange stationary phase according to claim 1.

10. The coated substrate of claim 9 in which said two or more amine-reactive functional groups are independently selected from epoxide, alkyl halides, benzylhalides, tosylates, mesylates and methylsulfides.

11. The coated substrate of claim 9 in which said substrate comprises a flow-through monolithic medium.

12. The coated substrate of claim 9 in which said substrate comprises a wall of a flow-through hollow tube.

13. The coated substrate of claim 9 in which said at least one of said two amine-reactive functional groups of said polyfunctional compound is an epoxide moiety.

14. A plurality of the coated substrates of claim 9 in the form of particles comprising ion exchange packing particles.

15. The coated substrate of claim 9 in which said substrate has a surface comprising an organic polymer.

16. An ion exchange stationary phase formed by a method comprising:
    (a) reacting at least a first polyfunctional compound comprising two or more amine-reactive functional groups with a primary amine, forming a first polymer layer with a population of reactive tertiary amines;
    (b) reacting at least a portion of said population of reactive tertiary amines with a polyfunctional compound comprising two or more amine-reactive functional groups, forming a second polymer layer with pendant amine-reactive functional groups, and a population of quaternary amines; and
    (c) reacting said second polymer layer with a di-tertiary amine with an amine compound linker joining a first tertiary amine moiety and a second tertiary amine moiety, wherein said amine compound linker is selected from substituted or unsubstituted alkyl and substituted or unsubstituted heteroalkyl.

17. The ion exchange stationary phase of claim 16, wherein said tertiary amine compound linker is selected from substituted or unsubstituted alkyl and substituted or unsubstituted heteroalkyl, with at least 2-20 atoms.

18. The ion exchange stationary phase of claim 16, wherein said polyfunctional compound is a diepoxide with a polyfunctional compound linker joining a first epoxide moiety and a second epoxide moiety, wherein said polyfunctional compound linker is selected from substituted or unsubstituted alkyl and substituted or unsubstituted heteroalkyl.

19. The ion exchange stationary phase of claim 18, wherein said polyfunctional compound linker is selected from substituted or unsubstituted alkyl and substituted or unsubstituted heteroalkyl, with at least 2-20 atoms.

* * * * *